(12) United States Patent
Manolakos et al.

(10) Patent No.: US 11,418,238 B2
(45) Date of Patent: Aug. 16, 2022

(54) SIDELINK-BASED CHANNEL STATE INFORMATION

(71) Applicant: QUALCOMM Incorporated, San Diego, CA (US)

(72) Inventors: Alexandros Manolakos, Escondido, CA (US); Seyedkianoush Hosseini, San Diego, CA (US); Gokul Sridharan, Sunnyvale, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/063,420

(22) Filed: Oct. 5, 2020

(65) Prior Publication Data
US 2021/0050888 A1 Feb. 18, 2021

Related U.S. Application Data

(63) Continuation of application No. PCT/US2020/046447, filed on Aug. 14, 2020.

(30) Foreign Application Priority Data

Aug. 16, 2019 (GR) .............................. 20190100363

(51) Int. Cl.
*H04L 27/22* (2006.01)
*H04B 7/0417* (2017.01)
(Continued)

(52) U.S. Cl.
CPC ......... *H04B 7/0417* (2013.01); *H04B 7/0452* (2013.01); *H04B 7/0626* (2013.01); *H04L 5/0023* (2013.01); *H04L 5/0057* (2013.01)

(58) Field of Classification Search
CPC . H04L 27/2331; H04L 1/0003; H04B 7/0417; H04B 7/0626; H04W 72/046
(Continued)

(56) References Cited

U.S. PATENT DOCUMENTS

| | | | | |
|---|---|---|---|---|
| 11,140,695 B1 * | 10/2021 | Eyuboglu | ........... | H04W 56/009 |
| 2014/0029458 A1 * | 1/2014 | Ye | ......................... | H04L 5/0053 |
| | | | | 370/252 |

(Continued)

FOREIGN PATENT DOCUMENTS

| | | |
|---|---|---|
| CN | 109644455 A | 4/2019 |
| WO | 2020107346 A1 | 6/2020 |

OTHER PUBLICATIONS

Ericson: "Details on CSIT Acquisition for SL Unicast", 3GPP Draft, 3GPP TSG-RAN WG1 Meeting #96, R1-1903175, Ericsson—Details on CSIT Acquisition for SL Unicast, 3rd Generation Partnership Project (3GPP), Mobile Competence Centre, 650, Route Des Lucioles, F-06921 Sophia-Antipolis Cedex, France, vol. Ran WG1, No. Athens, Greece, Feb. 25, 2019-Mar. 1, 2019, Feb. 15, 2019 (Feb. 15, 2019), XP051600871.

(Continued)

*Primary Examiner* — Khai Tran
(74) *Attorney, Agent, or Firm* — Patterson +Sheridan L.L.P.

(57) ABSTRACT

Certain aspects of the present disclosure provide techniques for providing channel state information associated with sidelink air interfaces. A method that may be performed by a first wireless node (e.g., a user equipment) includes receiving, from a base station, a reference signal (RS) configuration indicating one or more sidelink resource sets and transmitting, to one or more second wireless nodes, one or more sidelink reference signals based at least in part on the RS configuration. The method also includes receiving one or more feedback reports from the one or more second (Continued)

wireless nodes, wherein each of the feedback reports includes an ordered sequence of at least one parameter associated with a sidelink channel quality of the sidelink reference signals. The method further includes forwarding the one or more feedback reports to the base station.

30 Claims, 15 Drawing Sheets

(51) Int. Cl.
   *H04B 7/0452* (2017.01)
   *H04L 5/00* (2006.01)
   *H04B 7/06* (2006.01)
(58) Field of Classification Search
   USPC .............................. 375/330, 130, 260, 269
   See application file for complete search history.

(56) References Cited

U.S. PATENT DOCUMENTS

| | | | |
|---|---|---|---|
| 2018/0076873 A1* | 3/2018 | Xiao | H04B 17/309 |
| 2019/0349120 A1* | 11/2019 | Cheng | H04L 5/0078 |
| 2019/0364602 A1* | 11/2019 | Yi | H04W 72/1278 |
| 2021/0067279 A1 | 3/2021 | Sarkis et al. | |
| 2021/0091837 A1* | 3/2021 | Taherzadeh Boroujeni | H04W 76/27 |
| 2021/0143870 A1* | 5/2021 | Faxer | H04B 7/0697 |
| 2021/0176027 A1* | 6/2021 | Desai | H04L 1/18 |
| 2021/0273709 A1* | 9/2021 | Jiang | H04L 5/0023 |

OTHER PUBLICATIONS

International Search Report and Written Opinion—PCT/US2020/046447—ISA/EPO—dated Oct. 9, 2020.
Samsung: "Considerations on Sidelink CSI", 3GPP Draft, R1-1902279, 3GPP TSG RAN WG1 #96, 3rd Generation Partnership Project (3GPP), Mobile Competence Centre, 650, Route Des Lucioles, F-06921, Sophia-Antipolis Cedex, France, vol. Ran WG1, No. Athens, Greece, Feb. 25, 2019-Mar. 1, 2019, Feb. 15, 2019 (Feb. 15, 2019), XP051599974, 13 Pages, Retrieved from the Internet: URL: http://www.3gpp.org/ftp/tsg%5Fran/WG1%5FRL1/TSGR1%5F96/Docs/R1%2D1902279%2Ezip [retrieved on Feb. 15, 2019] pp. 1-3.
Spreadtrum Communications: "Discussion on NR Sidelink Physical Layer Structure", 3GPP Draft, R1-1900713, 3GPP TSG RAN WG1 Ad-Hoc Meeting 1901, Discussion on NR Sidelink Physical Layer Structure, 3rd Generation Partnership Project (3GPP), Mobile Competence Centre, 650, Route Des Lucioles, F-06921 Sophia-Antipolis Cedex, vol. Ran WG1, No. Taipei, Jan. 21, 2019-Jan. 25, 2019, Jan. 20, 2019 (Jan. 20, 2019), XP051593560.

* cited by examiner

SIDELINK-BASED CHANNEL STATE INFORMATION

CROSS-REFERENCE TO RELATED APPLICATION

This continuation application claims priority to PCT Application No. PCT/US2020/046447, filed Aug. 14, 2020, which claims benefit of and priority to Greek Patent Application No. 20190100363, filed Aug. 16, 2019, which are both hereby incorporated by reference in their entireties.

BACKGROUND

Field of the Disclosure

Aspects of the present disclosure relate to wireless communications, and more particularly, to techniques for providing channel state information associated with sidelink air interfaces.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that may include sidelink channel state information, which may enable desirable estimates of channel conditions between wireless communication devices.

Certain aspects provide a method for wireless communication by a first wireless node. The method may include receiving, from a base station, a channel state information (CSI) report configuration indicating to report feedback associated with one or more sidelink communication links. The CSI report configuration may be associated with one or more sidelink resource sets. The method may further include transmitting, to one or more second wireless nodes, a measurement configuration indicating the one or more sidelink resource sets to monitor and the CSI report configuration. The method may further include transmitting, to the one or more second wireless nodes, one or more sidelink reference signals. The method may further include receiving one or more feedback reports from the one or more second wireless nodes where each of the one or more feedback reports may include an ordered sequence of at least one parameter associated with a sidelink channel quality of the one or more sidelink reference signals.

Certain aspects provide a method for wireless communication by a second wireless node. The method generally includes receiving, from a base station or a first wireless node, a measurement configuration indicating one or more sidelink resource sets to monitor and a CSI report configuration associated with the one or more sidelink resource sets and monitoring sidelink transmissions, from the first wireless node, via the one more sidelink resource sets based at least in part on the measurement configuration. The method also includes generating, based on the CSI report configuration, a feedback report including an ordered sequence of at least one parameter associated with a sidelink channel quality of the sidelink transmissions and transmitting the feedback report to the first wireless node.

Certain aspects provide a method for wireless communication by a base station. The method generally includes transmitting, to a first wireless node, a reference signal (RS) configuration indicating one or more sidelink resource sets and receiving one or more feedback reports from the first wireless node, wherein each of the feedback reports includes an ordered sequence of at least one parameter associated with a sidelink channel quality of one or more sidelink reference signals transmitted by the first wireless node. The method also includes performing one or more actions based on the one or more feedback reports.

Certain aspects provide an apparatus for wireless communication. The apparatus may include a receiver and a transmitter. The receiver may receive, from a base station, a CSI report configuration indicating to report feedback associated with one or more sidelink communication links where the CSI report configuration is associated with one or more sidelink resource sets. The receiver may receive one or more feedback reports from one or more second wireless nodes where each of the one or more feedback reports may include an ordered sequence of at least one parameter associated with a sidelink channel quality of one or more sidelink reference signals. The transmitter may transmit, to the one or more second wireless nodes, a measurement configuration indicating the one or more sidelink resource sets to monitor and the CSI report configuration. The transmitter may transmit, to the one or more second wireless nodes, the one or more sidelink reference signals.

Certain aspects provide an apparatus for wireless communication. The apparatus may include a receiver, a processing system, a memory, and a transmitter. The receiver may receive, from a base station or a first wireless node, a measurement configuration indicating one or more sidelink resource sets to monitor and a CSI report configuration associated with the one or more sidelink resource sets. The receiver may be configured to monitor sidelink transmissions, from the first wireless node, via the one more sidelink resource sets based at least in part on the measurement configuration. The processing system and the memory may be configured to generate, based on the CSI report configuration, a feedback report including an ordered sequence of at least one parameter associated with a sidelink channel quality of the sidelink transmissions. The transmitter may transmit the feedback report to the first wireless node.

Certain aspects provide an apparatus for wireless communication. The apparatus may include means for receiving, from a base station, a channel state information (CSI) report configuration indicating to report feedback associated with one or more sidelink communication links, wherein the CSI report configuration is associated with one or more sidelink resource sets; means for transmitting, to one or more wireless nodes, a measurement configuration indicating the one or more sidelink resource sets to monitor and the CSI report configuration; means for transmitting, to the one or more wireless nodes, one or more sidelink reference signals; and means for receiving one or more feedback reports from the one or more wireless nodes, wherein each of the one or more feedback reports comprises an ordered sequence of at least one parameter associated with a sidelink channel quality of the one or more sidelink reference signals.

Certain aspects provide an apparatus for wireless communication. The apparatus may include means for receiving, from a base station or a first wireless node, a measurement configuration indicating one or more sidelink resource sets to monitor and a CSI report configuration associated with the one or more sidelink resource sets; means for monitoring sidelink transmissions, from the first wireless node, via the one more sidelink resource sets based at least in part on the measurement configuration; means for generating, based on the CSI report configuration, a feedback report including an ordered sequence of at least one parameter associated with a sidelink channel quality of the sidelink transmissions; and means for transmitting the feedback report to the first wireless node.

Certain aspects provide a computer readable medium having instructions stored thereon for receiving, from a base station, a channel state information (CSI) report configuration indicating to report feedback associated with one or more sidelink communication links, wherein the CSI report configuration is associated with one or more sidelink resource sets; transmitting, to one or more wireless nodes, a measurement configuration indicating the one or more sidelink resource sets to monitor and the CSI report configuration; transmitting, to the one or more wireless nodes, one or more sidelink reference signals; and receiving one or more feedback reports from the one or more wireless nodes, wherein each of the one or more feedback reports comprises an ordered sequence of at least one parameter associated with a sidelink channel quality of the one or more sidelink reference signals.

Certain aspects provide a computer readable medium having instructions stored thereon for receiving, from a base station or a first wireless node, a measurement configuration indicating one or more sidelink resource sets to monitor and a CSI report configuration associated with the one or more sidelink resource sets; monitoring sidelink transmissions, from the first wireless node, via the one more sidelink resource sets based at least in part on the measurement configuration; generating, based on the CSI report configuration, a feedback report including an ordered sequence of at least one parameter associated with a sidelink channel quality of the sidelink transmissions; and transmitting the feedback report to the first wireless node.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for reporting sidelink channel state information (CSI). In certain wireless communication systems, the sidelink CSI feedback may lack channel quality estimates that enables a BS to allocate resources and/or configure transmit or receive beams for beamformed (e.g., using a digital precoder) multi-UE sidelink communications (e.g., multi-user MIMO transmission from a UE to other UEs). Aspects of the present disclosure provide sidelink a CSI framework that may enable a UE to communicate with multiple UEs based on CSI feedback. For instance, the UEs may measure sidelink reference signals and report an ordered sequence of parameters associated with the sidelink channel quality of the sidelink reference signals. The ordered sequence may enable a BS to configure sidelink resources, transmit beams, and/or receive beams that may provide beamformed multi-UE sidelink communications.

The following description provides examples of reporting sidelink channel state information in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
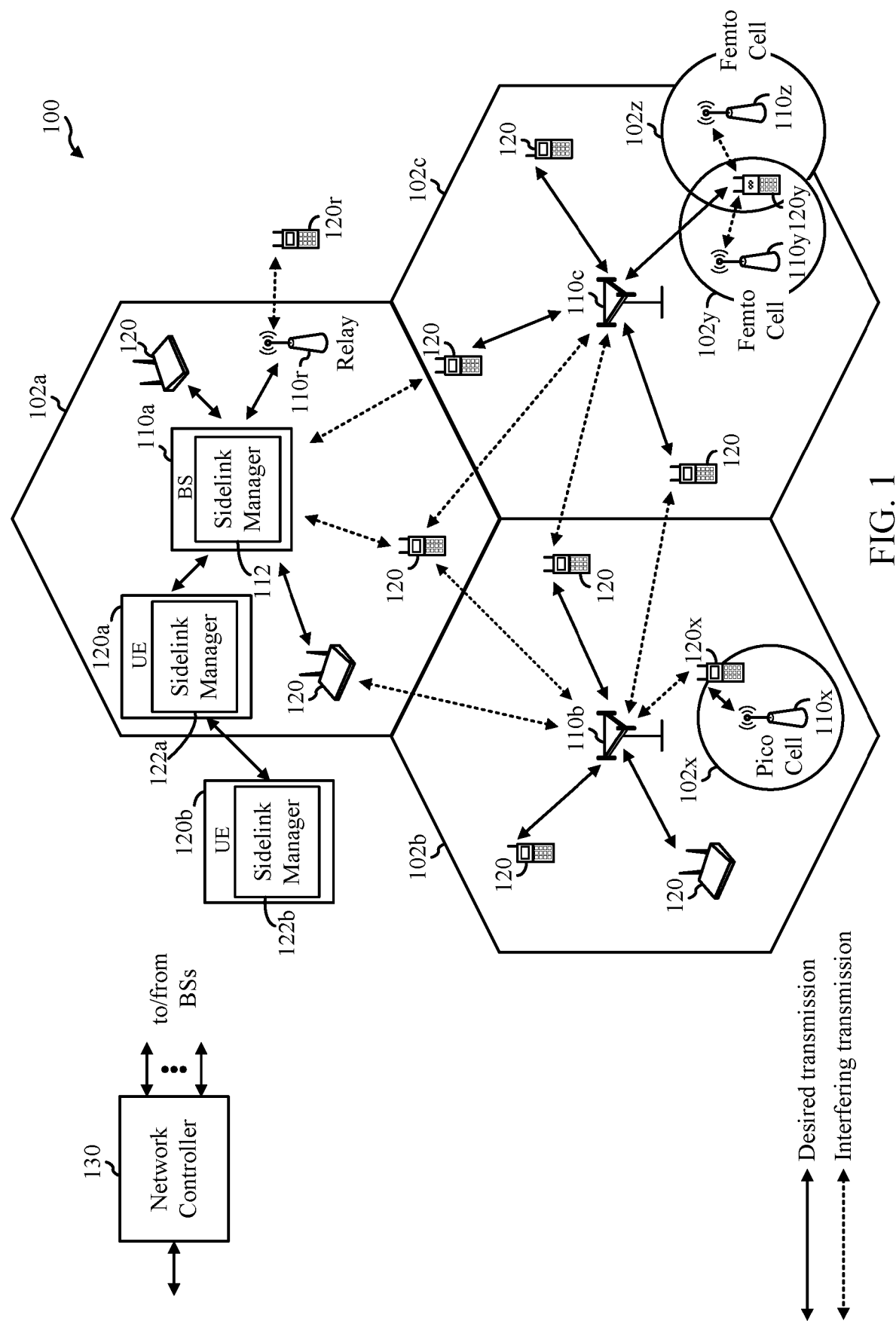
FIG. 1 is a block diagram conceptually illustrating an example telecommunications system, in accordance with certain aspects of the present disclosure.

FIG. 1 illustrates an example wireless communication network 100 in which aspects of the present disclosure may be performed. The wireless communication network 100 may be an NR system (e.g., a 5G NR network). The UE 120a includes a sidelink manager 122a that transmits sidelink reference signals, receives sidelink feedback reports from the UE 120b based on the sidelink reference signals, and in certain cases, transmits sidelink communications to another UE (e.g., the UE 120b) based on the sidelink feedback reports, in accordance with aspects of the present disclosure. The UE 120b includes a sidelink manager 122b that monitors the sidelink reference signals transmitted by the UE 120a and transmits the sidelink feedback reports associated with the sidelink reference signals to the UE 120a, in accordance with aspects of the present disclosure. The BS 110a includes a sidelink manager 112 that configures the sidelink resources for CSI feedback, receives feedback reports from the UE 120a, and performs one or more actions based on the feedback reports, in accordance with aspects of the present disclosure.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
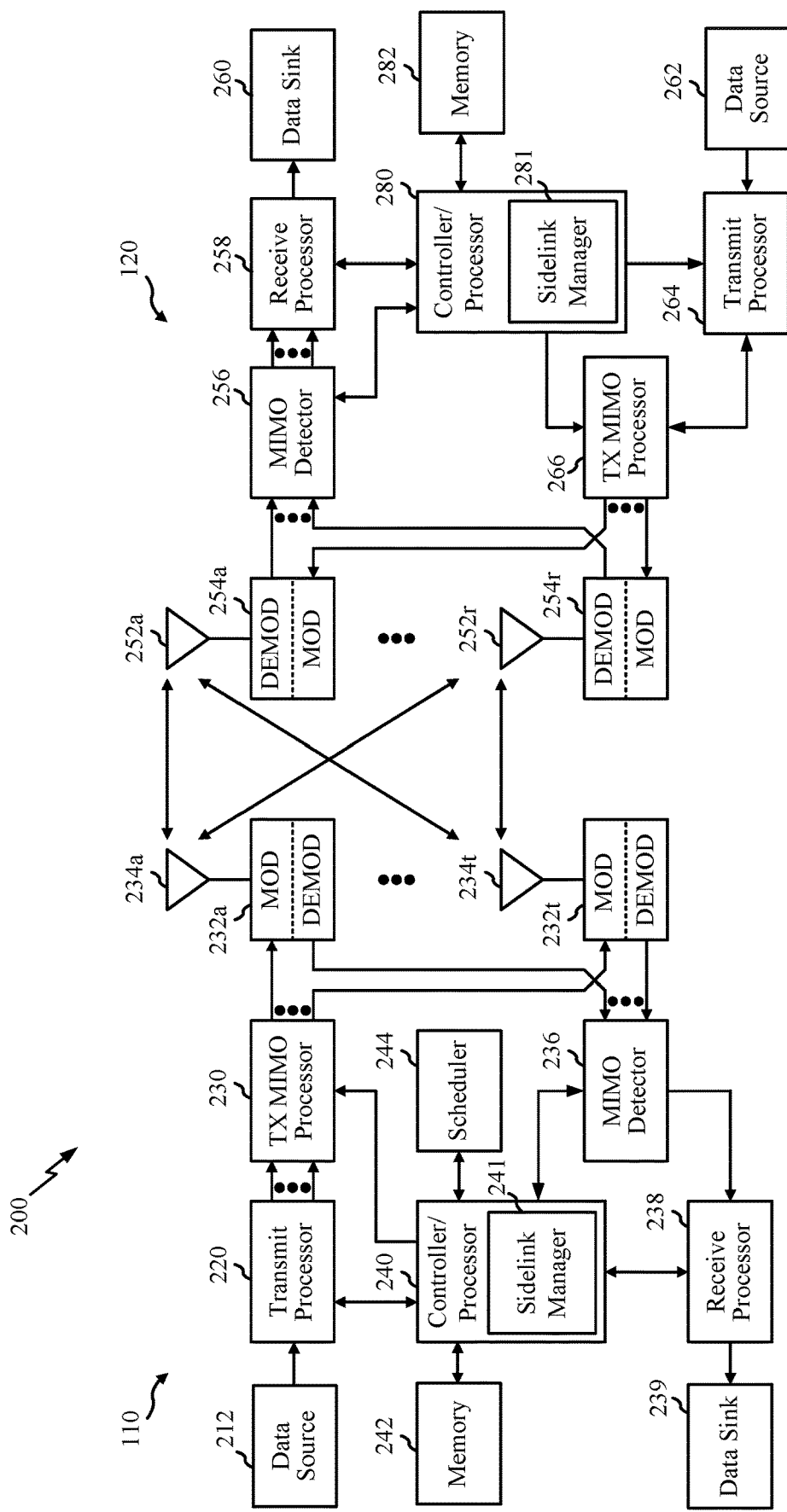
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in the transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110 has a sidelink manager 241 that configures the sidelink resources for CSI feedback, receives feedback reports from the UE 120a, and performs one or more actions based on the feedback reports, in accordance with aspects of the present disclosure. As shown in FIG. 2, the controller/processor 280 of the UE 120 has a sidelink manager 241 that transmits sidelink reference signals, receives sidelink feedback reports from another UE based on the sidelink reference signals, and forwards the feedback reports to the BS 110, in accordance with aspects of the present disclosure. In certain aspects, the sidelink manager 241 may monitor sidelink reference signals transmitted by another UE and transmit feedback reports associated with the sidelink reference signals to the other UE, in accordance with aspects of the present disclosure. Although shown at the Controller/Processor, other components of the UE 120a and BS 110a may be used performing the operations described herein.

Figure 3:
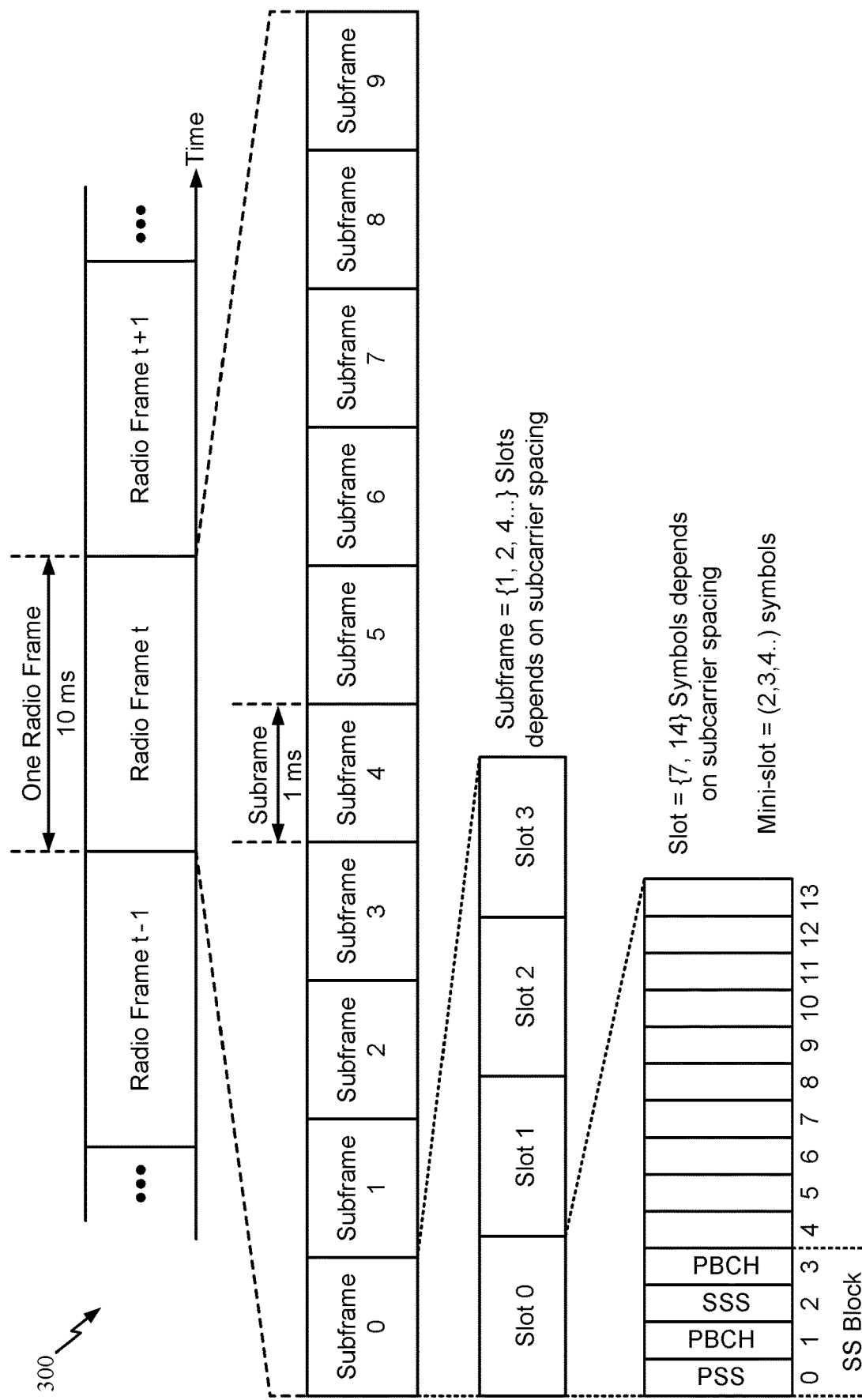
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7, 12, or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., downlink (DL), uplink (UL), or flexible) for data transmission and the link direction for each subframe may be dynamically switched. The link directions may be based on the slot format. Each slot may include DL/UL data as well as DL/UL control information. In certain aspects, sidelink transmissions (e.g., transmissions between UEs) may use DL and/or UL time-domain resources.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmWave. The up to sixty-four transmissions of the SS block are referred to as the SS burst set. SS blocks in an SS burst set are transmitted in the same frequency region, while SS blocks in different SS bursts sets can be transmitted at different frequency locations.

Example Sidelink-Based Channel State Information

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions. For instance, proximal devices may use the PSDCH to discover each other.

The PSCCH may carry control signaling such as sidelink resource configurations and other parameters used for data transmissions. The starting symbol and the number of symbols for a PSCCH may be assumed to be known to the receiving UE before decoding the PSCCH.

The PSSCH may carry data transmissions, and the UE may transmit or receive data transmissions in a slot on a carrier. In certain aspects, all the symbols in a slot may be available for sidelink data transmissions, or only a subset of consecutive symbols in a slot may be available for sidelink data transmissions.

The PSFCH may carry feedback such as channel state information related to a sidelink channel quality. In some cases, the PSFCH may use a sequence-based PSFCH format with one symbol (not including an automatic gain control training period). The PSFCH format may be based on a physical uplink control channel format (e.g., format 2). In aspects, the PSFCH format may span all available symbols for sidelink in a slot.

A sidelink bandwidth part (BWP) configuration may be separate from a DL/UL BWP configuration signalling. As used herein, a DL/UL BWP may also be referred to as a UTRAN/UE (Uu) BWP or air interface. The UE may not be expected to use a different numerology in the configured SL BWP and active UL BWP in the same carrier at a given time. In a licensed carrier, SL BWP may be configured separately from DL/UL BWP. The same SL BWP may be used for both transmission and reception. For time-domain resources of a PSSCH, the resource pool may include non-contiguous time-domain resources. For frequency domain resources of a PSSCH, the resource pool may include contiguous physical resource blocks (PRBs) or non-contiguous PRBs. Sidelink communications may be via cyclic prefix-OFDM (CP-OFDM) communications. The UE may report, to the BS via a Uu air interface, an indication for resources to retransmit a sidelink transport block (TB) transmitted by the UE.

In wireless communications, CSI may refer to known channel properties of a communication link. The CSI may represent the combined effects of, for example, scattering, fading, and power decay with distance between a transmitter and receiver. Channel estimation may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter. As an example, CSI may include a Channel Quality Indicator (CQI), a precoding matrix indicator (PMI), a CSI-RS resource indicator (CRI), a SS/PBCH Block Resource indicator (SSBRI), a layer indicator (LI), a rank indicator (RI) and/or L1 reference signal received power (L1-RSRP).

In certain circumstances, sidelink channel quality may be estimated via CSI feedback. Sidelink CSI reporting may be enabled and disabled by control signalling such as radio resource control (RRC) signalling, downlink control information (DCI), medium access control (MAC) signalling (e.g., a MAC control element (MAC-CE)). Sidelink CSI feedback may provide CQI/RI measurements for no more than two CSI-RS antenna ports. The sidelink CSI-RS may be within a PSSCH transmission. Sidelink CSI may be configured using one of two modes. In the first mode, a BS may configure and schedule sidelink resource allocations (e.g., CSI resources) to all UEs involved in sidelink communications. In the second mode, the BS may configure and schedule sidelink resource allocations (e.g., CSI resources) to at least one UE, which then forwards the sidelink resource allocations to other UE(s) via sidelink communication channels. The second mode may be used in circumstances where some of the UEs are out of coverage from BS transmissions, but in coverage of sidelink transmissions of at least one UE.

In certain wireless communication systems (such as 5G NR systems), the sidelink CSI feedback may lack channel quality estimates that enables a BS to allocate resources for beamformed (e.g., using a digital precoder) multi-UE sidelink communications (e.g., multi-user MIMO transmission from a UE to other UEs). For instance, the sidelink CSI feedback may lack channel quality estimates associated with multiple transmit beams and/or receive beams. In other aspects, the sidelink CSI feedback may lack channel quality estimates for sidelink precoding such as a precoding matrix indicator (PMI) and/or rank indicator (RI).

Aspects of the present disclosure provide a sidelink CSI framework that may enable a UE to communicate with multiple UEs based on CSI feedback. For example, a BS may configure a first UE to transmit one or more periodic or semi-persistent sidelink reference signal (RS) resource sets (each one having one or more RS resources). The BS may also configure the first UE to report sidelink CSI feedback based on a set of parameters. For instance, a CSI Report configuration may be associated with the configured RS resource sets. One or more second UEs may receive a sidelink CSI report configuration (either form the BS directly or via the first UE) to measure all (or a subset) of the sidelink RS resource set(s) transmitted by the first UE, by configuring measurement resources which are associated with a report configuration indicating, for example, what parameters to report, how often to report the sidelink CSI, and via which channel. Each of the second UEs may measure the sidelink RSs and report an ordered sequence of parameters associated with the sidelink channel quality (e.g., a sounding reference signal indicator (SRI), CRI, transmit PMI (TPMI), and/or transmit RI (TRI)). The first UE may aggregate the sidelink CSI reports received from the second UEs into a package and reports the sidelink CSI feedback to the BS, for example, through PUSCH or long PUCCH according to a periodic configuration or DCI triggering. In aspects, the BS may configure or trigger the first UE to transmit sidelink communications via the PSCCH/PSSCH based on the sidelink feedback. For example, if the sidelink feedback indicates that SRI=1 provides a suitable sidelink air interface for most of the second UEs, then the BS may configure the first UE to communicate with the second UEs via a PSCCH/PSSCH with SRI=1.

Figure 4:
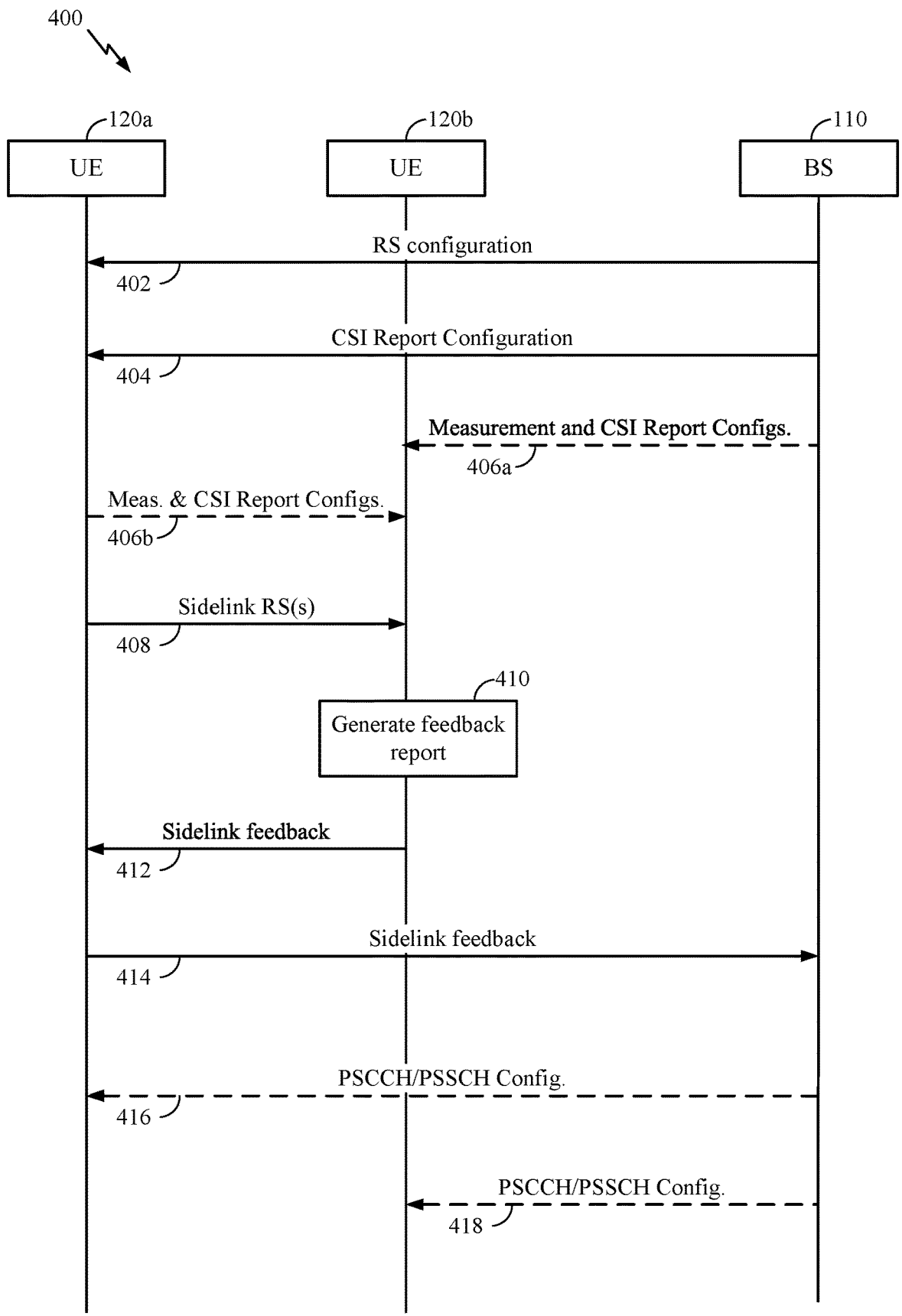
FIG. 4 is a call flow diagram illustrating example signaling for reporting sidelink channel state information, in accordance with aspects of the present disclosure.

FIG. 4 is a call flow diagram illustrating example operations 400 for reporting sidelink CSI, in accordance with certain aspects of the present disclosure. At 402, the UE 120a may receive, from the BS 110, a sidelink RS configuration indicating one or more sidelink resource sets that may be used to transmit sidelink RSs to other UEs such as the UE 120b.

At 404, the UE 120a may receive, from the BS 110, a CSI report configuration indicating to report feedback associated with sidelink communication links (e.g., a sidelink air interface between UE 120a and UE 120b). For instance, the CSI report configuration may be associated with at least one of the one or more sidelink resource sets, which may indicate to the UE 120a to report any received feedback reports, from other UEs (e.g., UE 120b), associated with the RS transmissions to the BS 110. In certain aspects, the BS 110 may generate the CSI report configuration before transmitting the configuration to the UE 120a.

In certain aspects, the UE 120b may receive, from the BS 110 at 406a, a measurement configuration indicating the one or more sidelink resource sets to monitor and the CSI report configuration associated with the one or more sidelink resource sets. The measurement configuration may indicate whether specific CSI report configurations are enabled or disabled. In other aspects, at 406b, the UE 120b may receive both the configurations from the UE 120a, which may be forwarding the configurations from the BS 110. For instance, the BS 110 may provide the configurations to the UE 120b directly, if the UE 120b is in cell coverage of the BS 110. In other cases, if the UE 120b is out of cell coverage of the BS 110, the configurations may be forwarded to the UE 120b via the UE 120a.

The UE 120b may determine the one or more sidelink resource sets to monitor based on the measurement configuration, which may indicate which sidelink resource sets to monitor. The CSI report configuration received at 406a/b may indicate to the UE 120b which parameters associated with a sidelink channel quality to measure and report (e.g., a RSRP, a received signal strength indicator (RSSI), a signal-to-noise-plus-interference ratio (SINR), TPMI, a TRI, a CRI, a SRI, or a sidelink resource set indicator).

At 408, the UE 120a may transmit, to the UE 120b, one or more sidelink RSs. The UE 120a may transmit the one or more sidelink RSs to the UE 120b based at least in part on the RS configuration received at 402. At 410, the UE 120b may generate, based on the CSI report configuration received at 406a/b, a feedback report including an ordered sequence of at least one parameter associated with a sidelink channel quality of the sidelink RS transmissions. The ordered sequence of parameters may be ordered based on the sidelink channel quality associated with one or more transmit beams, one or more receive beams, or the one or more sidelink resource sets. For instance, the feedback report may indicate the sidelink channel quality of the one or more receive beams used to monitor the sidelink RS transmissions. In other cases, the feedback report may indicate the sidelink channel quality of the one or more transmit beams used to transmit the sidelink RS transmissions. In still other cases, the feedback report may indicate the sidelink channel quality of the one or more sidelink resource sets.

At 412, the UE 120b may transmit, to the UE 120a, the feedback report based at least in part on the CSI report configuration. For instance, the UE 120b may transmit the feedback report via sidelink data or control resource pools indicated in the CSI report configuration received at 406a/b. The UE 120a may also receive the feedback report via the control resource pools indicated in the CSI report configuration received at 404.

At 414, the UE 120a may forward the feedback report to the BS 110, for example, using an uplink resource pool indicated in the CSI report configuration received at 404. The BS 110 may perform one or more actions based on the feedback report. At 416, the BS 110 may transmit, to the UE 120a, resource allocations, based on the feedback report, for sidelink communications, and at 418, the BS 110 may transmit, to the UE 120b, resource allocations, based on the feedback report, for the sidelink communications. For instance, the ordered sequence of parameters may enable the BS 110 to configure the one or more transmit beams, the or more receive beams, and/or the one or more sidelink resource sets that provide a suitable channel quality (e.g., a spectral efficiency, a throughput value, a spectral efficiency per energy unit, or a SINR associated with the one or more transmit beams, the one or more receive beams, or the one or more sidelink resource sets) on sidelink air interfaces between the UEs 120a and 120b.

Figure 5:
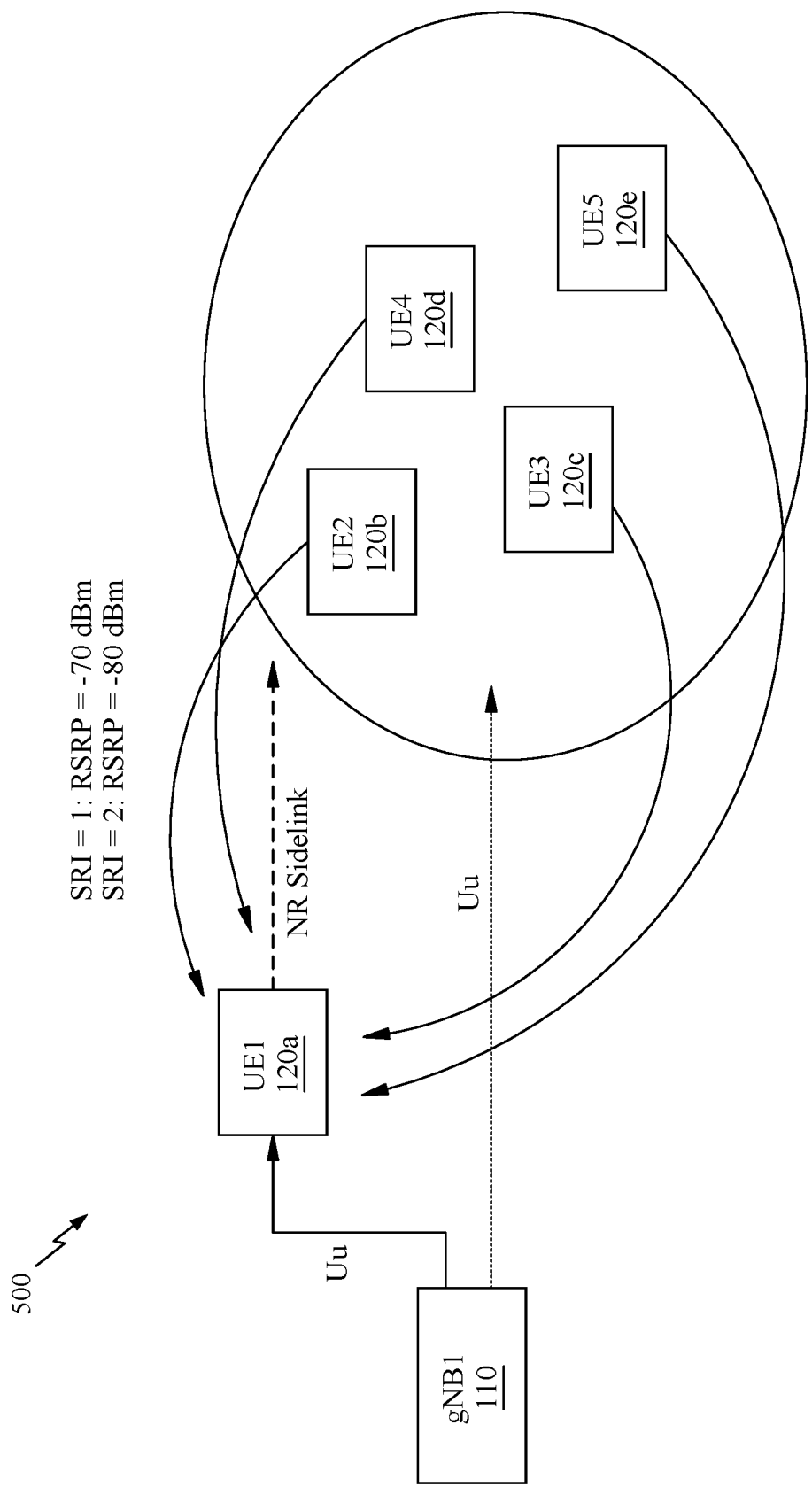
FIG. 5 illustrates an example wireless communication network reporting sidelink CSI, in accordance with certain aspects of the present disclosure.

FIG. 5 illustrates an example wireless communication network 500 reporting sidelink CSI, in accordance with certain aspects of the present disclosure. The BS 110 may configure the UE 120a to transmit sidelink RSs to UEs 120b-e and report sidelink CSI feedback from the UEs 120b-e. The sidelink CSI feedback from each of the UEs 120b-e may be an ordered sequence of parameters associated with one or more resource sets, one or more transmit beams, and/or one or more receive beams. For example, the ordered sequence may include RSRP for each of sidelink RS resource sets (e.g., a SRS resources set indicated by a SRI). Based on the ordered sequence of the parameters, the BS 110 may configure the one or more transmit beams, the one or more receive beams, and/or the one or more resource sets that provide a suitable sidelink channel quality (e.g., a spectral efficiency, a throughput value, a spectral efficiency per energy unit, or a SINR associated with the one or more transmit beams, the one or more receive beams, or the one or more sidelink resource sets) for one or more of the UEs 120a-e. For instance, if the sidelink CSI feedback indicates that the SRS resources associated with a given SRS resource indicator (e.g., SRI=1) provides a suitable sidelink air interface (e.g., an RSRP above a given threshold) for most of the UEs 120b-e, then the BS 110 may configure the UE 120a to communicate with the UEs 120b-e via a PSCCH/PSSCH with the SRS resources associated with the SRS resource indicator.

Figure 6:
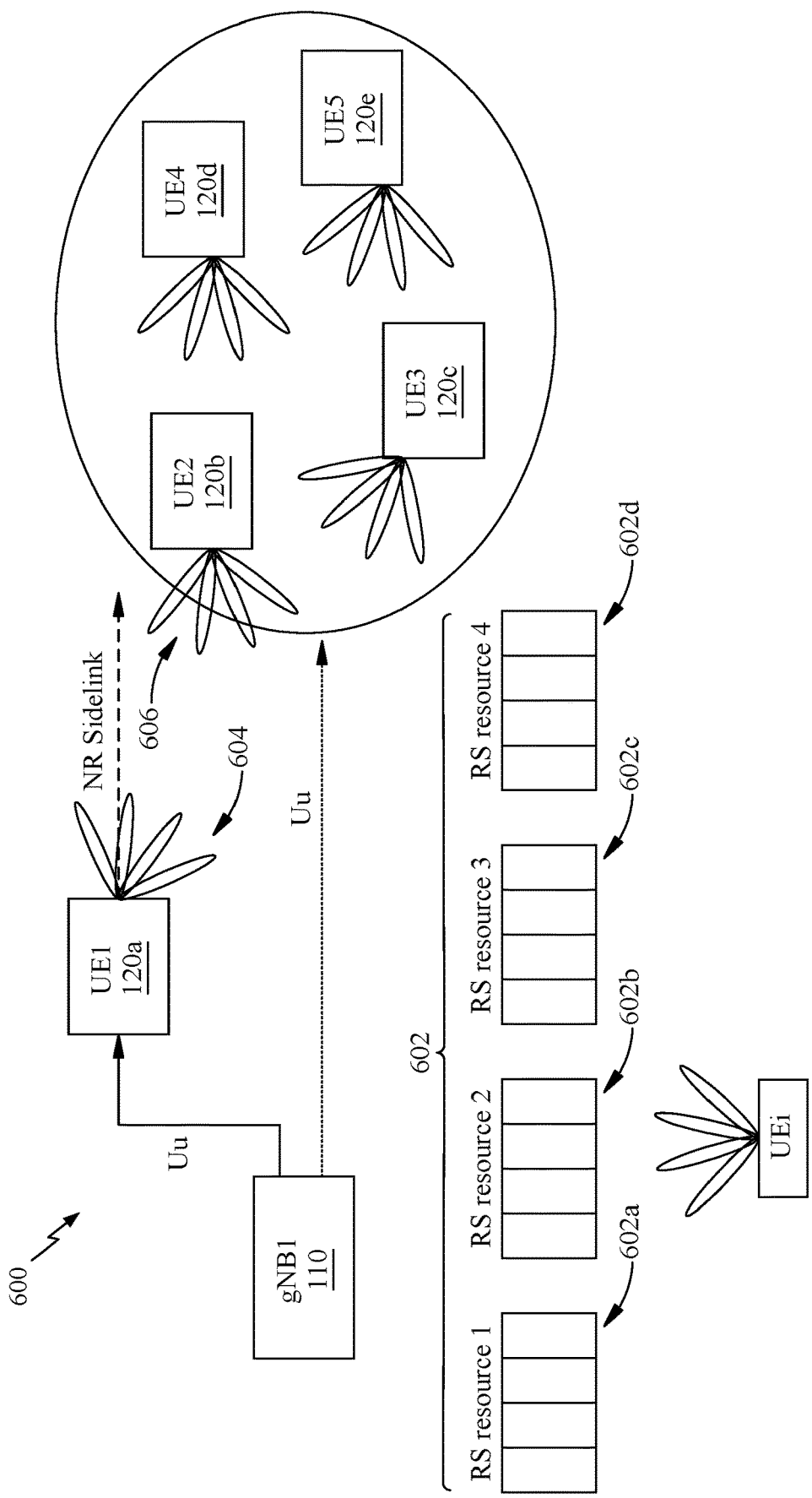
FIG. 6 illustrates an example wireless communication network where the sidelink CSI feedback report may provide transmit and/or receive beam training information, in accordance with certain aspects of the present disclosure.

FIG. 6 illustrates an example wireless communication network 600 where a sidelink CSI feedback report may provide transmit and/or receive beam training information, in accordance with certain aspects of the present disclosure. The BS 110 may configure the UE 120a with multiple RS resources 602 (for example, a first RS resource 602a, a second RS resource 602b, a third RS resource 602c, and a fourth RS resource 602d) in a non-codebook-based RS resource set (or an uplink beam management (UL BM) set). Each RS resource 602 may have a duration of four OFDM symbols, for example. The BS 110 may configure the UEs 120b-e to measure each of the RS resources 602. The UE 120a may transmit via each of the RS resources 602 using a different transmit beam 604. The UEs 120b-e may measure each of the RS resources 602 via different receive beams 606. The UEs 120b-e may generate a feedback report providing information associated with channel quality of each of the transmit/receive beam pairs.

Figure 7:
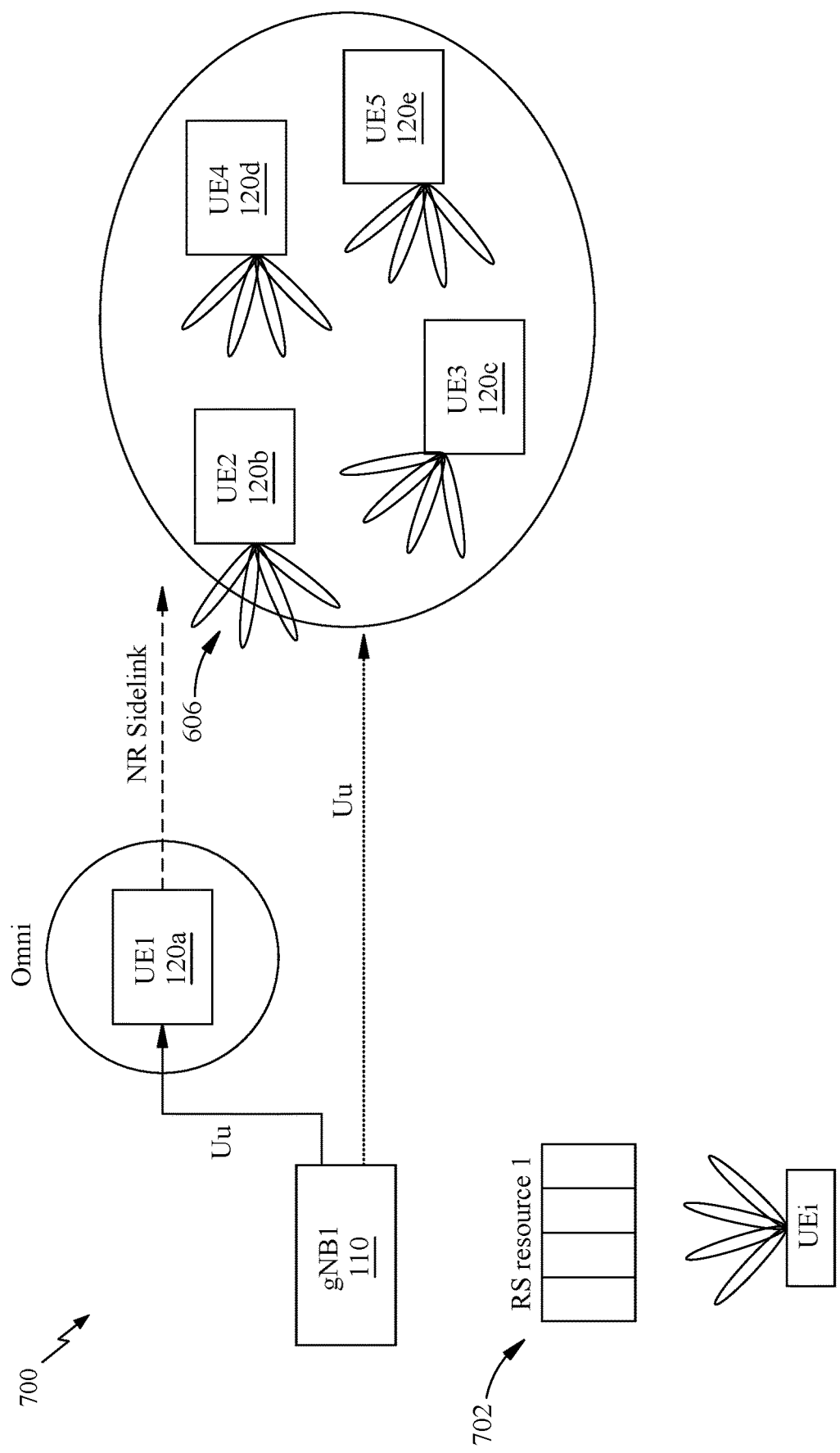
FIG. 7 illustrates an example wireless communication network where the sidelink CSI feedback report may provide receive beam training information, in accordance with certain aspects of the present disclosure.

FIG. 7 illustrates an example wireless communication network 700 where a sidelink CSI feedback report may provide receive beam training information, in accordance with certain aspects of the present disclosure. For instance, the BS 110 may configure the UE 120a with a codebook-based RS resource set having a single RS resource 702. The RS resource 702 may have a duration of four symbols, for example. The BS 110 may configure the UEs 102b-e to measure the RS resource 702. The UEs 120b-e may measure the RS resource 702 via different receive beams 606 and generate a feedback report providing channel quality of each of the receive beam. In some cases, the UE 120a may transmit a sidelink RS via the RS resource 702 using an omnidirectional radiation pattern. In other cases, the UE 120a may transmit a SRS to the BS 110 via the RS resource 702, and the UEs 120b-e may monitor the SRS transmissions.

Figure 8:
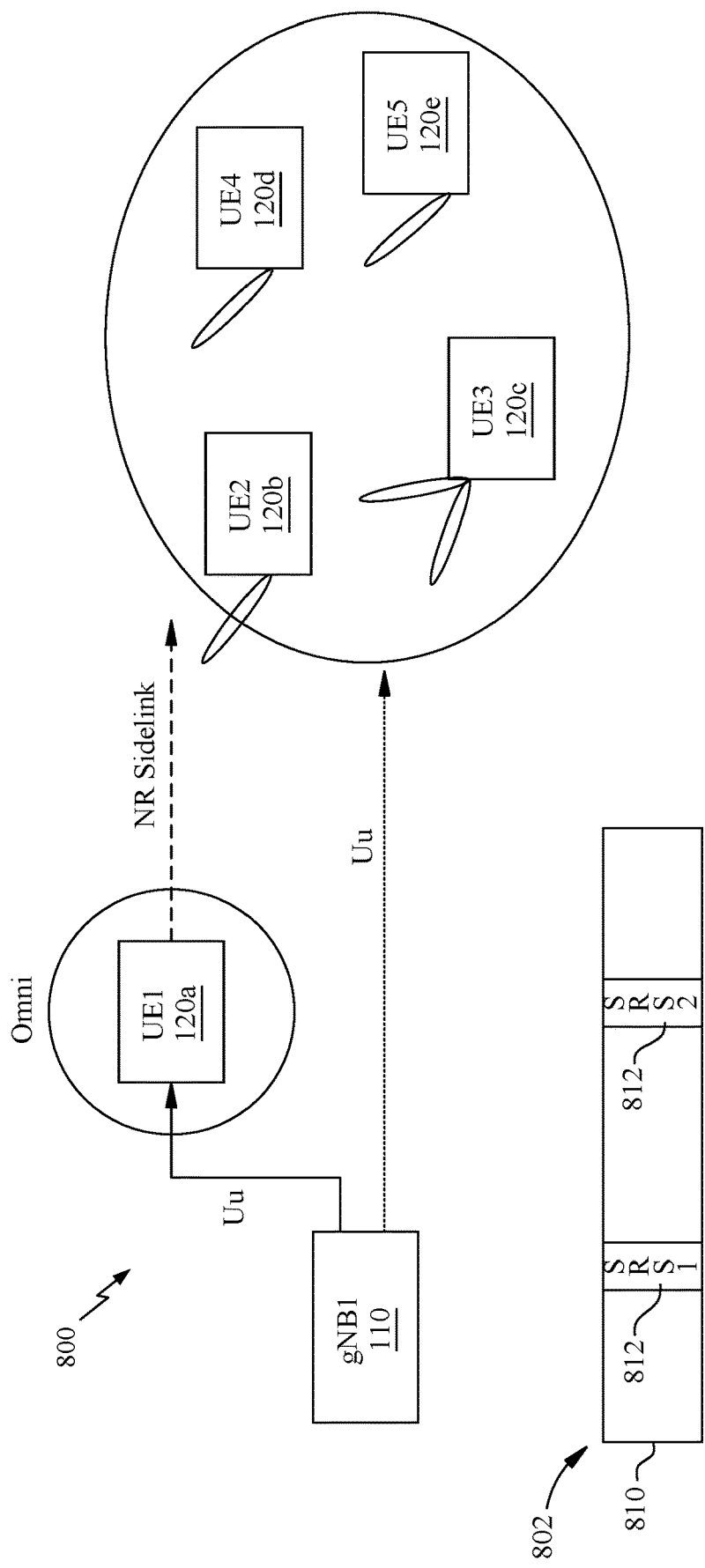
FIG. 8 illustrates an example wireless communication network where the sidelink CSI feedback report may provide tracking information, in accordance with certain aspects of the present disclosure.

FIG. 8 illustrates an example wireless communication network 800 where a sidelink CSI feedback report may provide tracking information, in accordance with certain aspects of the present disclosure. For example, the BS 110 may configure the UE 120a with a RS resource set 802 for tracking purposes. The RS resource set 802 may include at least two RS resources 812 that are in a same slot 810 and non-consecutive to each other. That is, the RS resources 812 may be offset from each other in the same slot 810. Each of the two RS resources 812 may include one or more consecutive OFDM symbols. The BS 110 may configure the UEs 120b-e to measure the RS resources 812. For instance, the UEs 120b-e may determine tracking information associated with the RS resources 812, such as, quasi-location (QCL) parameters including Doppler shift, Doppler spread, delay spread, average delay for the PSCCH/PSSCH based on the monitored RS resources 812. If the UE 120a transmits multiple tracking RS resource sets, the UEs 120b-e may generate a feedback report that orders the parameters according to channel quality of the RS resource set 802. That is, the sidelink CSI feedback report may be ordered at a resource set level.

Figure 9:
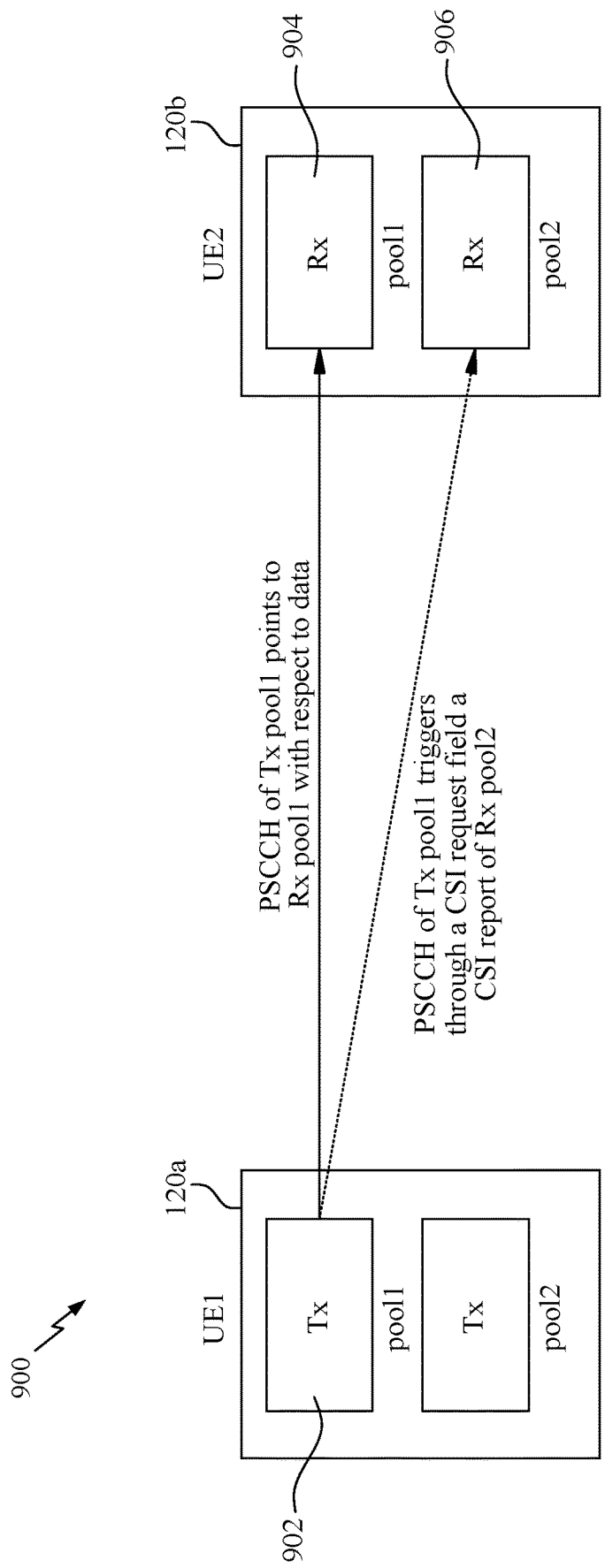
FIG. 9 illustrates an example wireless communication network where a UE may enable various sidelink resource pools on another UE, in accordance with certain aspects of the present disclosure.

FIG. 9 illustrates an example wireless communication network 900 where a UE may enable various sidelink resource pools on another UE, in accordance with certain aspects of the present disclosure. The UE 120a may transmit, to the UE 120b, RS measurement configuration and CSI report configuration, using a sidelink channel such as a PSSCH/PSCCH, via a RRC message or MAC CE. For instance, the UE 120a may use TX resource pool 1 902 to transmit data to the UE 120b, which may receive data transmissions via RX resource pool 1 904. The RS measurement configuration may enable the UE 120b to monitor the RX resource pool 1 904 and generate CSI feedback associated with the TX resource pool 1 902 transmissions. In case of an aperiodic CSI report, the UE 120a may transmit, to the UE 120b, a PSCCH that includes a CSI trigger that enables CSI monitoring and reporting on the UE 120b. For instance, the UE 120a may transmit, via the TX resource pool 1 902, a DCI message having a CSI request field that triggers a report on RX resource pool 2 906 of the UE 120b.

Figure 10:
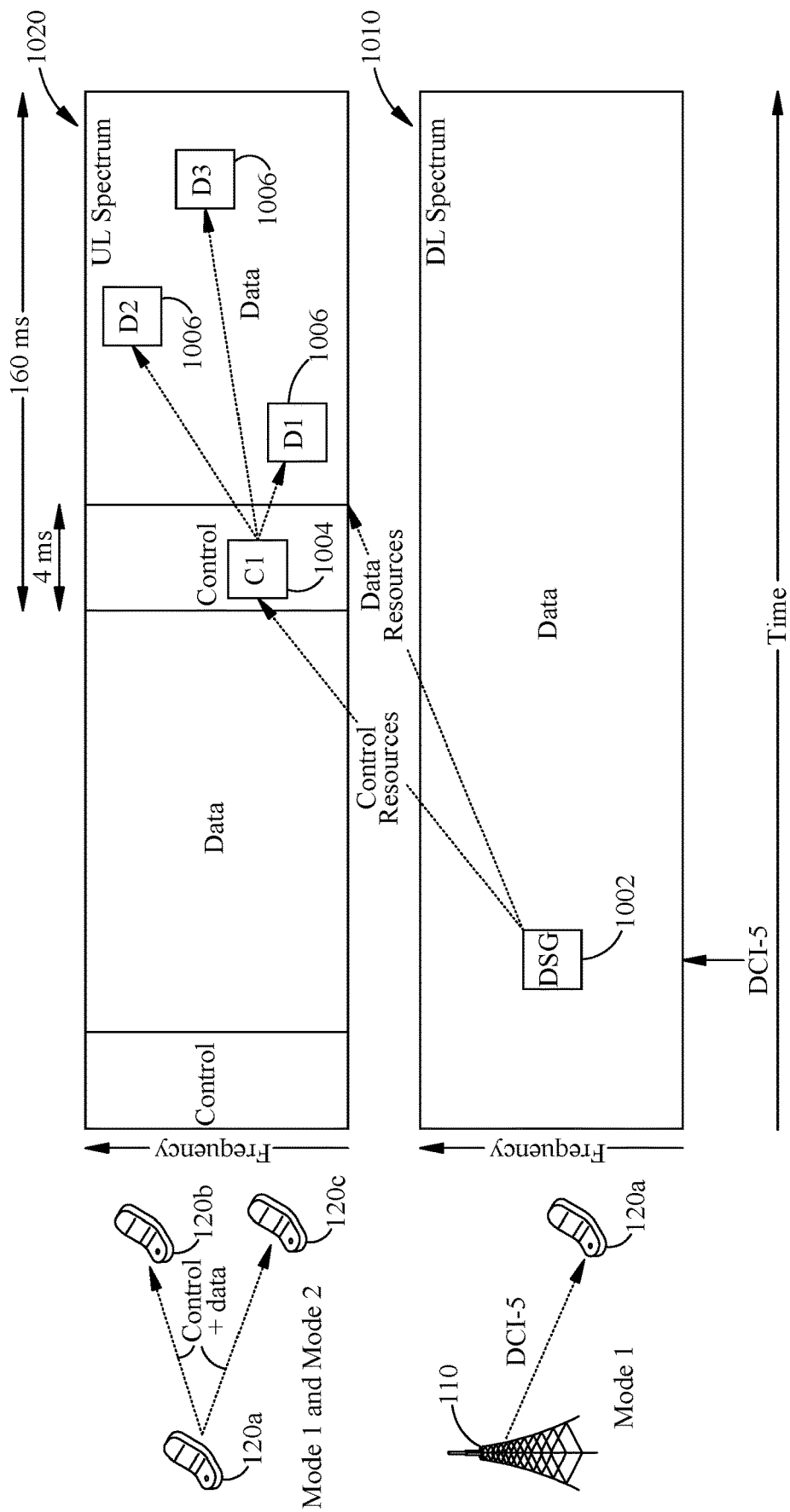
FIG. 10 illustrates an example sidelink resource allocation, in accordance with certain aspects of the present disclosure.

FIG. 10 illustrates an example sidelink resource allocation, in accordance with certain aspects of the present disclosure. In certain aspects, the UEs 120b and 120c may be out of cell coverage of the BS 110, and the UE 120a may receive, from the BS 110, a downlink control message 1002, indicating a sidelink resource configuration, within a downlink resource pool 1010 having time-domain and frequency-domain resources (e.g., a DL BWP). The UE 120a may forward the sidelink resource configuration to the UEs 120b and 120c via sidelink control resources 1004, for example. In other aspects, the UEs 120a-c may be within cell coverage of the BS 110, and in such a case, the UEs 120a-c may receive, from the BS 110, the downlink control message 1002 providing the sidelink resource configuration for the UEs 120a-c directly.

The sidelink resource configuration may provide sidelink control and data resources within an uplink resource pool 1020 having time-domain and frequency domain resources (e.g., an UL BWP). That is, the uplink resources may include resources for sidelink communications, in certain cases. For instance, the sidelink resource configuration may include sidelink control resource(s) 1004 and sidelink data resources 1006. The UE 120a may communicate with the UEs 120b and 120c via the sidelink control resources 1004 and sidelink data resources 1006. For instance, the UE 120a may transmit various configurations (such as the measurement configuration and CSI report configuration described herein) via the sidelink control resources 1004. In other cases, the UEs 120a may transmit the sidelink CSI report feedback via the sidelink control resources 1004 and/or sidelink data resources 1006.

In some cases, the RS resource set for the sidelink RSs and the resources indicated in the corresponding CSI report configuration may be configured within a sidelink BWP. A similar RS resource set may be defined with a Uu BWP and associated with a communication-based use-case dedicated for Uu, such as codebook-based transmissions, non-codebook-based transmissions, or uplink beam management transmissions. Whenever the UE is configured with the two RS configurations in both the BWP-SL and BWP-Uu, which may result in the same RS transmission, the UE may be expected to transmit one RS which is intended for both purposes. For example, the one or more sidelink RSs may also serve as sounding reference signals (SRSs) for uplink transmissions to the BS 110. In other words, the SRSs transmitted to the BS 110 may serve as the sidelink RSs for sidelink CSI feedback as described herein.

In certain aspects, the RS resource set may be within a Uu BWP and dedicated for codebook-based, or non-codebook-based, or UL BM transmissions. The CSI report may be defined within a sidelink BWP and associated with the RS resource of the Uu BWP. The UE may determine that such a RS resource set is being measured by other UEs that will report sidelink CSI parameters to the UE based on the RS resource.

The RS resource set may have multiple resources, each one pointing to a different direction to provide transmit beam training information. Multiple RS resource sets may be configured. In certain aspects, only one RS resource set may be used for communication with the Uu gNB (e.g., RS resource set for codebook-based or non-codebook-based UL).

Figure 11:
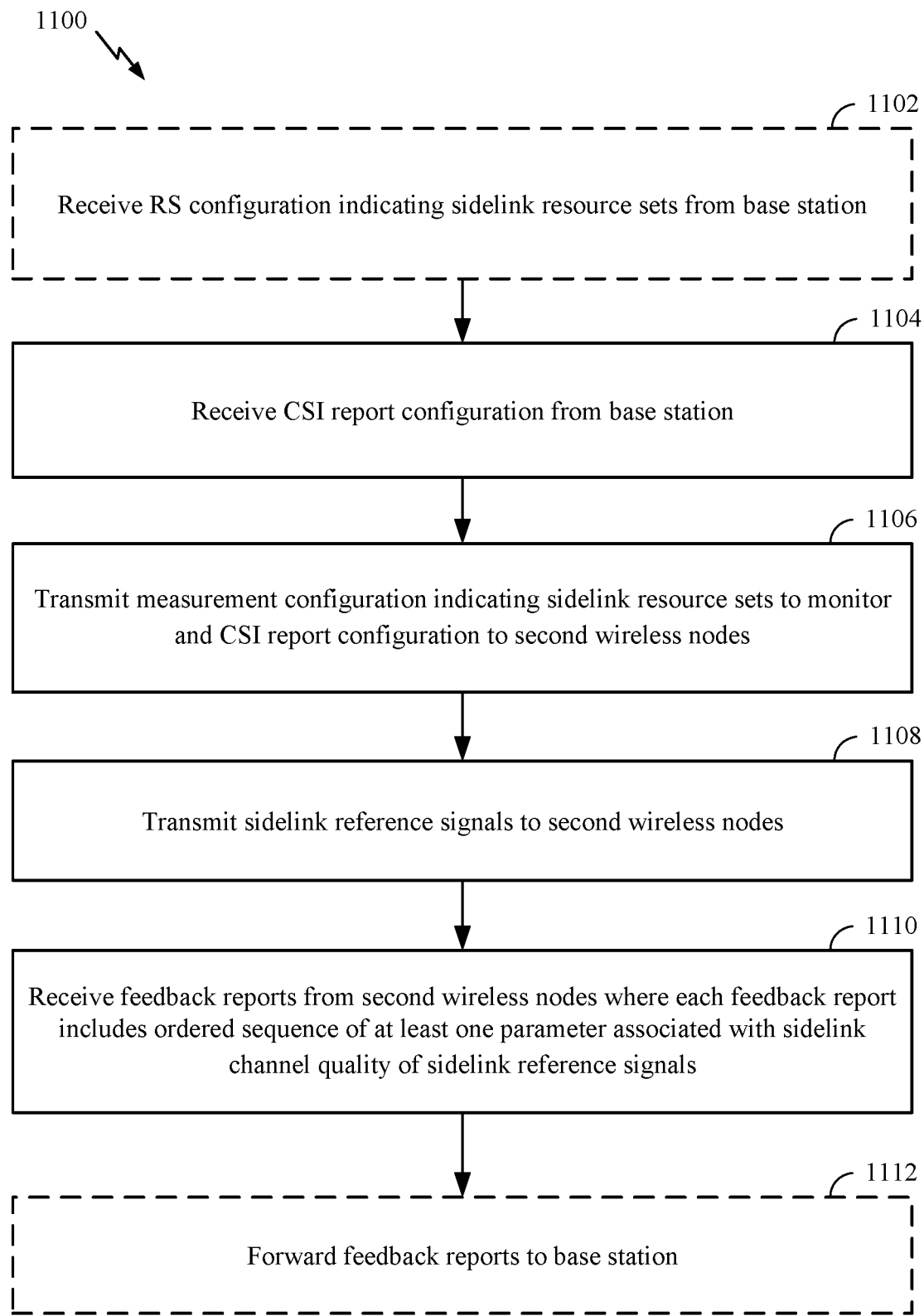
FIG. 11 is a flow diagram illustrating example operations for wireless communication by a first wireless node, in accordance with certain aspects of the present disclosure.

FIG. 11 is a flow diagram illustrating example operations 1100 for wireless communication, in accordance with certain aspects of the present disclosure. The operations 1100 may be performed, for example, by a wireless node, such as a first wireless node (e.g., UE 120*a*). Operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals. As used herein, a wireless node may refer to a wireless communications device such as a UE or a vehicle in a V2X application.

The operations 1100 may optionally begin, at 1102, where the first wireless node may receive, from a base station (e.g., BS 110), a RS configuration indicating one or more sidelink resource sets. At 1104, the first wireless node may receive a CSI report configuration indicating to report feedback associated with one or more sidelink communication links from the BS. The CSI report configuration may be associated with the one or more sidelink resource sets. At 1106, the first wireless mode may transmit a measurement configuration indicating the one or more sidelink resource sets to monitor and the CSI report configuration to one or more second wireless nodes (e.g., UEs 120*b-e*). At step 1108, the first wireless node may transmit, to the one or more second wireless nodes, one or more sidelink RSs (e.g., SRS and/or CSI-RS). The first wireless node may transmit the one or more sidelink RSs to the one or more second wireless nodes based at least in part on the RS configuration. At 1110, the first wireless node may receive one or more feedback reports from the one or more second wireless nodes. Each feedback report may include an ordered sequence of at least one parameter associated with a sidelink channel quality of the sidelink RSs. Optionally, at 1112, the first wireless node may forward the one or more feedback reports to the BS.

The ordered sequence of the parameters may be ordered such that a first a value of the parameters may provide a suitable channel quality according to a given metric between the first wireless node and second wireless node. The next values in the ordered sequence may provide an equal or reduced channel quality according to the given metric. For example, the ordering may be such that if the reported first values of the parameters are used for the transmission, a corresponding spectral efficiency is higher (e.g., the CQI is higher per layer) relative to the second values of the parameters, and the second values may provide a higher spectral efficiency relative to the third values in the sequence.

If multiple parameters are reported, the ordering may be in tuples. That is, the ordered sequence of the parameters may include a plurality of tuples ordered based on the sidelink channel state quality associated with at least one of the sidelink resource sets or resources of one of the sidelink resource sets. For example, the ordered sequence may be an ordered sequence of tuples such as (RI1, PMI1, CQI1), (RI2, PMI2, CQI2), (RI3, PMI3, CQI3). Each tuple may be associated with a different transmit beam, receive beam, RS resource of a set, and/or RS resource set. The ordering of the tuples may be based on one or more of the parameters in a tuple or a sidelink channel quality, such as CQI1>CQI2>CQI3, or CQI1*RI1>CQI2*RI2>CQI3*RI3. The ordered sequence may indicate the transmit beam, receive beam, resource, and/or RS resource set with the best sidelink channel quality. In certain aspects, the transmit beam and receive beam characteristics of the ordered sequence may be implicitly conveyed. That is, the transmit beams and/or receive beams may be associated with the different RS resources and/or resource sets.

The ordered sequence of the at least one parameter includes a plurality of parameter values, each parameter value being associated with at least one of a transmit beam, a receive beam, a sidelink resource, or a sidelink resource set. The ordered sequence of the parameters may be ordered based on the sidelink channel quality associated with at least one of one or more transmit beams, one or more receive beams, resources of one of the sidelink resource sets, or the sidelink resource sets. A sidelink channel quality may be determined based on various metrics such as a spectral efficiency, throughput, spectral efficiency per energy unit, SINR, etc. In other words, the ordered sequence of the parameters may be ordered based on at least one of a spectral efficiency, a throughput value, a spectral efficiency per energy unit, or SINR associated with at least on of one or more transmit beams, one or more receive beams, resources of one of the sidelink resource sets, or the sidelink resource sets. For example, the parameters associated with a sidelink resource (corresponding to a transmit beam and/or receive beam) providing the greatest spectral efficiency may be ordered as the first set of values in the ordered sequence, and the next set of values may be for the parameters associated with a different sidelink resource (corresponding to different transmit beam and/or receive beam) providing an equal or lower spectral efficiency. The at least one parameter may include at least one of a RSRP, RSSI, SINR, TPMI, TRI, CRI, SRI, or a sidelink resource set indicator.

The operations 1100 may also include the first wireless node receiving, from the base station, a CSI report configuration, for example, as described herein with respect to FIG. 4. The CSI report configuration may indicate to the first wireless node to report feedback associated with sidelink communication links. The CSI report configuration may be associated with the one or more sidelink resource sets, which may indicate to the first wireless node to report any feedback reports received from other wireless nodes and associated with the RS transmissions.

The first wireless node may forward the one or more feedback reports to the base station based on the CSI report configuration. For instance, the CSI report configuration may indicate one or more resources for forwarding feedback to the base station and/or receiving feedback from the one or more second wireless nodes. That is, the CSI report configuration may provide a first set of resources for receiving the feedback reports from the second wireless nodes and/or a second set of resource for reporting the feedback reports to the base station. The one or more resources indicated in the CSI report configuration may be within one or more sidelink bandwidth parts (BWPs).

In certain aspects, the one or more sidelink resource sets for the sidelink RS transmissions may be within one or more sidelink BWPs. In other aspects, the one or more sidelink resource sets and the one or more resources indicated in the CSI report configuration may be within on or more sidelink BWPs.

In some cases, the sidelink RS configuration may configure RS resources that coincide with RS resources associated with BS-UE (Uu) air interfaces or BWPs. If a UE is configured with multiple RS configurations having at least one in a sidelink BWP and another in a Uu BWP that result in the same RS transmission, the UE may be expected to transmit one RS which is intended for both purposes (sidelink and uplink measurements). For instance, the operations 1100 may include the first wireless node determining that the first wireless node is configured with a plurality of RS configurations comprising the RS configuration in a sidelink BWP and an another RS configuration in an uplink BWP. The first wireless node may determine a resource set for RS transmissions based on the plurality of RS configurations and transmit one or more reference signals, to the base station and the one or more second wireless nodes, via the determined resource set.

In certain aspects, the one or more sidelink resource sets for the sidelink RS transmissions may be within a Uu BWP such as an UL BWP, for example, as described herein with respect to FIG. 10. In certain cases, the CSI report configuration may indicate resources for receiving feedback in a sidelink BWP, and the CSI report configuration may be associated with the one or more sidelink resource sets within the Uu BWP. For instance, the operations 1100 may include the first wireless node receiving, from the base station, a CSI report configuration indicating to report feedback associated with sidelink communication links, wherein the CSI report configuration is associated with the one or more sidelink resource sets and indicates resources in a sidelink BWP.

The RS configuration and/or the CSI report configuration may indicate the resource type of the one or more sidelink resource sets. For instance, the RS configuration and/or the CSI report configuration may indicate whether at least one of the sidelink resource sets is periodic, semi-persistent, or aperiodic. In aspects, the sidelink CSI feedback may be reported on an aperiodic basis. For instance, the first wireless node may transmit an aperiodic CSI trigger to the one or more second wireless nodes. The aperiodic CSI trigger may include a downlink control information (DCI) message including a CSI request field. The RS configuration may further indicate whether at least one of the sidelink resource sets is used for uplink beam management, codebook based transmissions, or non-codebook based transmissions.

Each of the one or more sidelink resource sets may include one or more sidelink resources, and each resource may include one or more symbols. In certain cases, different transmit beams may be used for different sidelink resources. That is, the first wireless node may transmit different sidelink resources via different transmit beams, for example as described herein with respect to FIG. 6. For instance, each of the sidelink resources of at least one of the sidelink resource sets may correspond to a different transmission configuration indication (TCI) state or a different quasi-colocation (QCL) relationship associated with spatial reception parameters, which may indicate to the first wireless node to use different transmit beams for different sidelink resources.

In certain aspects, the sidelink CSI feedback report may provide tracking information, for example, as described herein with respect to FIG. 8. As an example, at least one of the sidelink resource sets may include at least two sidelink resources in the same slot and non-consecutive to each other with respect to time domain resources. Each of the at least two sidelink resources may include one or more consecutive OFDM symbols. The at least two sidelink resources may be in the same bandwidth and correspond to the same uplink antenna port.

In certain circumstances, the first wireless node may forward a measurement configuration and a CSI report configuration to the one or more second wireless nodes. For example, the first wireless node may forward these configurations when the second one or more wireless nodes are out of cell coverage of the base station. The operations 1100 may include the first wireless node receiving, from the base station, a measurement configuration indicating which sidelink resource sets the one or more second wireless nodes are to monitor and a CSI report configuration for the one or more second wireless nodes, wherein the CSI report configuration is associated with the one or more sidelink resource sets. The first wireless node may forward, through a sidelink control or data channel resource pool, for example as described herein with respect to FIG. 10, the measurement configuration and the CSI report configuration to the one or more second wireless nodes. The CSI report configuration for the second wireless nodes may indicate the at least one parameter to report to the first wireless node. The first wireless node may transmit the measurement configuration and/or the CSI report configuration via RRC signaling (e.g., an RRC message) and/or MAC signaling (e.g., MAC-CE).

The measurement configuration for the second wireless nodes may indicate to the one or more second wireless nodes to monitor the sidelink resources using different receive beams. For instance, the measurement configuration may indicate that the one or more sidelink reference signals are to be transmitted at a plurality of time-domain resources using the same spatial transmit filter. The second wireless nodes may determine, based on the RSs being transmitted via the same spatial filter, to use different receive beams at the different time-domain resources (e.g., slots).

The first wireless node may receive the feedback reports via various air interfaces. For instance, the first wireless node may receive the feedback report via at least one of a long format PSFCH, a PSCCH, or a PSSCH. The channel selected for communicating the feedback report may depend on various factors including the size of the feedback report and/whether ACK/NACK feedback is enabled.

Figure 12:
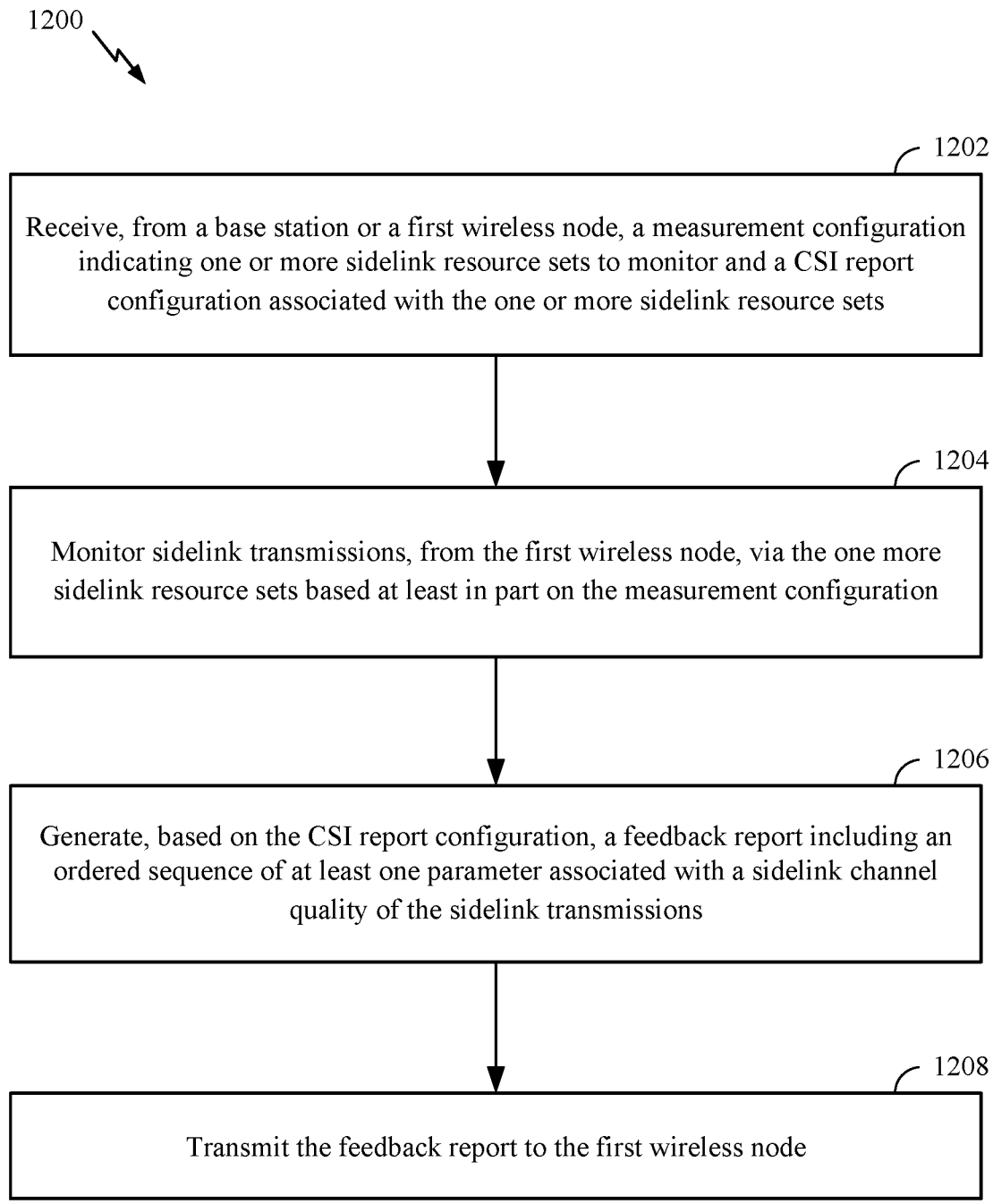
FIG. 12 is a flow diagram illustrating example operations for wireless communication by a second wireless node, in accordance with certain aspects of the present disclosure.

FIG. 12 is a flow diagram illustrating example operations 1200 for wireless communication, in accordance with certain aspects of the present disclosure. The operations 1200 may be performed, for example, by a wireless node (e.g., the UE 120b-e). Operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 may begin, at 1202, where a second wireless node receives, from a base station (e.g., BS 110) or a first wireless node (e.g., UE 120a), a measurement configuration indicating one or more sidelink resource sets to monitor and a CSI report configuration associated with the one or more sidelink resource sets. At 1204, the second wireless node may monitor sidelink transmissions, from the first wireless node, via the one more sidelink resource sets based at least in part on the measurement configuration. At 1206, the second wireless node may generate, based on the CSI report configuration, a feedback report including an ordered sequence of at least one parameter associated with a sidelink channel quality of the sidelink transmissions. At 1208, the second wireless node may transmit the feedback report to the first wireless node.

The CSI report configuration indicates the at least one parameter to report to the first wireless node. The second wireless node may generate the ordered sequence of the at least one parameter according to the various formats as described herein with respect to the operations 1100. For instance, the ordered sequence of the parameters may be ordered based on the sidelink channel quality associated with at least one of one or more transmit beams, one or more receive beams, resources of one of the sidelink resource sets, or the sidelink resource sets. The sidelink channel quality may be determined based on various metrics such as a spectral efficiency, throughput, spectral efficiency per energy unit, SINR, etc.

The CSI report configuration may indicate one or more resources for transmitting the feedback report to the first wireless node. The one or more resources may be within one or more sidelink BWPs.

In certain aspects, the one or more sidelink resource sets for the sidelink RS transmissions may be within one or more sidelink BWPs. In other aspects, the one or more sidelink resource sets and the one or more resources indicated in the CSI report configuration may be within on or more sidelink BWPs.

The CSI report configuration may indicate the resource type of the one or more sidelink resource sets. The CSI report configuration further indicates whether at least one of the sidelink resource sets is periodic, semi-persistent, or aperiodic. In aspects, the sidelink CSI feedback may be reported on an aperiodic basis. For instance, the second wireless node may receive, from the base station or the first wireless node, an aperiodic CSI trigger that triggers the monitoring. The aperiodic CSI trigger may include a downlink control information (DCI) message including a CSI request field. The measurement configuration may further indicate whether at least one of the sidelink resource sets is used for uplink beam management, codebook based transmissions, or non-codebook based transmissions.

Each of the one or more sidelink resource sets may include one or more sidelink resources, and each resource may include one or more symbols. In certain cases, different receive beams may be used for different sidelink resources. That is, the second wireless node may receive different sidelink resources via different receive beams, for example as described herein with respect to FIGS. 6 and 7. For instance, the measurement configuration may indicate to monitor the sidelink resources using different receive beams. For instance, the measurement configuration may indicate that the one or more sidelink reference signals are to be transmitted at a plurality of time-domain resources using the same spatial transmit filter. The second wireless nodes may determine, based on the RSs being transmitted via the same spatial filter, to use different receive beams at the different time-domain resources (e.g., slots).

In certain aspects, the sidelink CSI feedback report may provide tracking information, for example, as described herein with respect to FIG. 8. As an example, at least one of the sidelink resource sets may include at least two sidelink resources in the same slot and non-consecutive to each other with respect to time domain resources. Each of the at least two sidelink resources may include one or more consecutive OFDM symbols. The at least two sidelink resources may be in the same bandwidth and correspond to the same uplink antenna port.

The second wireless node may receive the measurement configuration and/or the CSI report configuration via RRC signaling (e.g., an RRC message) and/or MAC signaling (e.g., MAC-CE).

The second wireless node may transmit the feedback report via various air interfaces. For instance, the second wireless node may transmit the feedback report via at least one of a long format PSFCH, a PSCCH, or a PSSCH. The channel selected for communicating the feedback report may depend on various factors including the size of the feedback report and/or whether ACK/NACK feedback is enabled.

Figure 13:
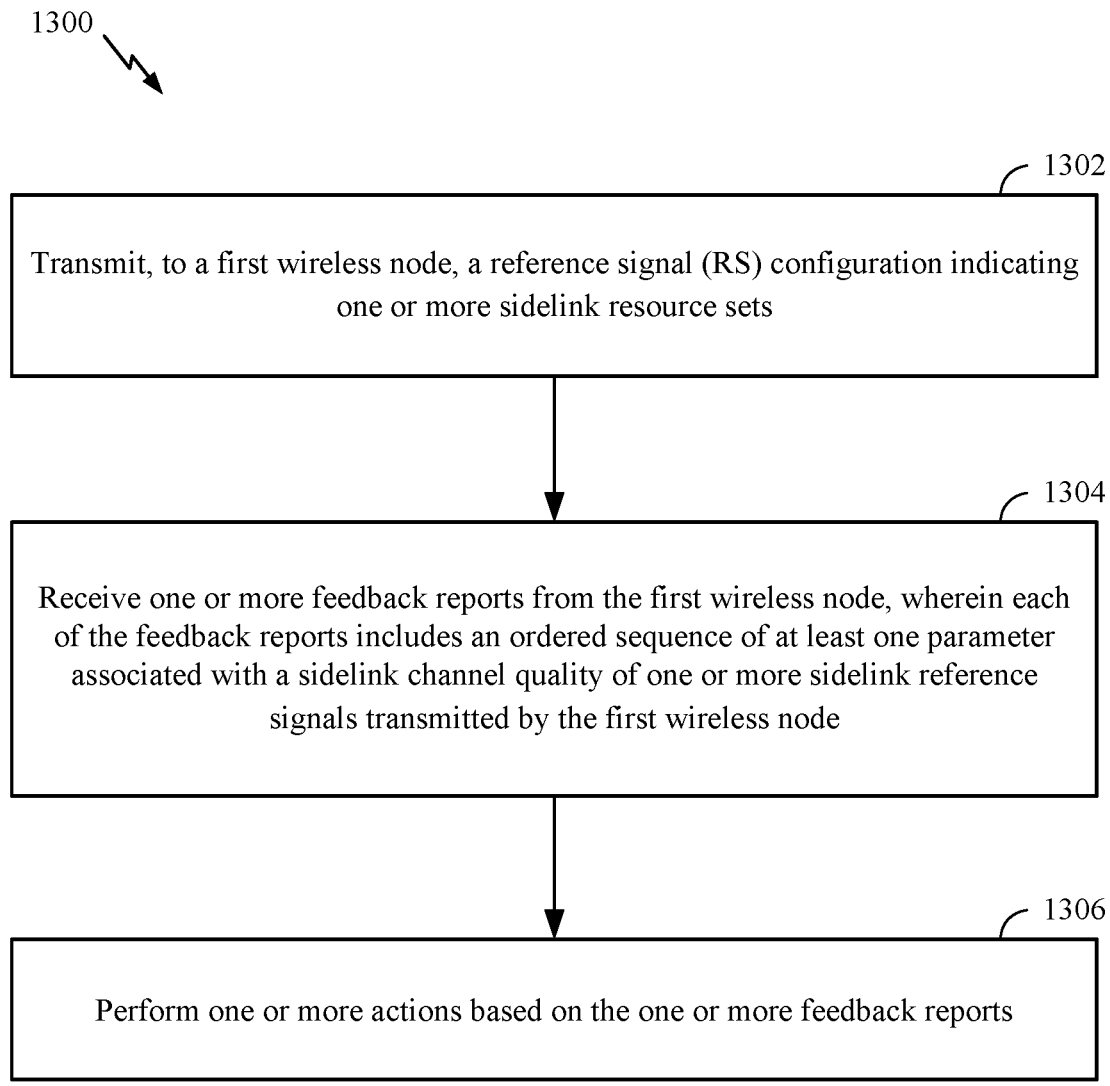
FIG. 13 is a flow diagram illustrating example operations for wireless communication by a base station, in accordance with certain aspects of the present disclosure.

FIG. 13 is a flow diagram illustrating example operations 1300 for wireless communication, in accordance with certain aspects of the present disclosure. The operations 1300 may be performed, for example, by a BS (e.g., the BS 110). The operations 1300 may be complimentary to the operations 1100 or 1200. The operations 1300 may be implemented as software components that are executed and run on one or more processors (e.g., controller/processor 240 of FIG. 2). Further, the transmission and reception of signals by the BS in operations 1300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1300 may begin, at 1302, where the BS may transmit, to a first wireless node (e.g., UE 120a), a reference signal (RS) configuration indicating one or more sidelink resource sets. At 1304, the BS may receiving one or more feedback reports from the first wireless node, wherein each of the feedback reports includes an ordered sequence of at least one parameter associated with a sidelink channel quality of one or more sidelink reference signals transmitted by the first wireless node. At 1306, the BS may performing one or more actions based on the one or more feedback reports.

The operations 1300 may also include the BS transmitting, to the first wireless node, a CSI report configuration. The CSI report configuration may indicate to the first wireless node to report feedback associated with sidelink communication links, wherein the CSI report configuration is associated with the one or more sidelink resource sets.

In certain aspects, the BS may receive the one or more feedback reports based on the CSI report configuration. For instance, the CSI report configuration may indicate one or more resources for forwarding feedback to the base station and/or receiving feedback from the one or more second wireless nodes. That is, the CSI report configuration may provide a first set of resources for receiving the feedback reports from the second wireless nodes and/or a second set of resource for reporting the feedback reports to the BS. The one or more resources indicated in the CSI report configuration may be within one or more sidelink bandwidth parts (BWPs).

In certain aspects, the one or more sidelink resource sets for the sidelink RS transmissions may be within one or more sidelink BWPs. In other aspects, the one or more sidelink resource sets and the one or more resources indicated in the CSI report configuration may be within on or more sidelink BWPs.

In some cases, the sidelink RS configuration may configure RS resources that coincide with RS resources associated with BS-UE (Uu) air interfaces or BWPs. If a UE is configured with multiple RS configurations having at least one in a sidelink BWP and another in a Uu BWP that result in the same RS transmission, the UE may be expected to transmit one RS which is intended for both purposes (sidelink and uplink measurements). For instance, the operations 1300 may include the BS determining that the first wireless node is configured with a plurality of RS configurations comprising the RS configuration in a sidelink BWP and an another RS configuration in an uplink BWP. The BS may determine a resource set for RS transmissions based on the plurality of RS configurations and receive one or more reference signals, from the first wireless node, via the determined resource set.

In certain aspects, the one or more sidelink resource sets for the sidelink RS transmissions may be within a Uu BWP such as an UL BWP, for example, as described herein with respect to FIG. 10. In certain cases, the CSI report configuration may indicate resources for receiving feedback in a sidelink BWP, and the CSI report configuration may be associated with the one or more sidelink resource sets within the Uu BWP. For instance, the operations 1300 may include the BS transmitting, to the first wireless node, a CSI report configuration indicating to report feedback associated with sidelink communication links, wherein the CSI report configuration is associated with the one or more sidelink resource sets and indicates resources in a sidelink BWP.

The RS configuration and/or the CSI report configuration may indicate the resource type of the one or more sidelink resource sets. For instance, the RS configuration and/or the CSI report configuration may indicate whether at least one of the sidelink resource sets is periodic, semi-persistent, or aperiodic. In aspects, the sidelink CSI feedback may be reported on an aperiodic basis. For instance, the BS may transmit an aperiodic CSI trigger to one or more second wireless nodes. The aperiodic CSI trigger may include a downlink control information (DCI) message including a CSI request field. The RS configuration may further indicate whether at least one of the sidelink resource sets is used for uplink beam management, codebook based transmissions, or non-codebook based transmissions.

Each of the one or more sidelink resource sets may include one or more sidelink resources, and each resource may include one or more symbols. In certain cases, different transmit beams may be used for different sidelink resources. That is, the first wireless node may transmit different sidelink resources via different transmit beams, for example as described herein with respect to FIG. 6. For instance, each of the sidelink resources of at least one of the sidelink resource sets may correspond to a different transmission configuration indication (TCI) state or a different quasi-colocation (QCL) relationship associated with spatial reception parameters, which may indicate to the first wireless node to use different transmit beams for different sidelink resources.

In certain aspects, the sidelink CSI feedback report may provide tracking information, for example, as described herein with respect to FIG. 8. As an example, at least one of the sidelink resource sets may include at least two sidelink resources in the same slot and non-consecutive to each other with respect to time domain resources. Each of the at least two sidelink resources may include one or more consecutive OFDM symbols. The at least two sidelink resources may be in the same bandwidth and correspond to the same uplink antenna port.

In certain circumstances, the first wireless node may forward a measurement configuration and/or a CSI report configuration from the BS to one or more second wireless nodes. For example, the first wireless node may forward these configurations when the second one or more wireless nodes are out of cell coverage of the base station. The operations 1300 may include the BS transmitting to the first wireless node a measurement configuration indicating which sidelink resource sets one or more second wireless nodes are to monitor, and/or a CSI report configuration for the one or more second wireless nodes, wherein the CSI report configuration is associated with the one or more sidelink resource sets. The CSI report configuration for the second wireless nodes may indicate the at least one parameter to report to the first wireless node. The BS may transmit the measurement configuration and/or the CSI report configuration via RRC signaling (e.g., an RRC message) and/or MAC signaling (e.g., MAC-CE).

In other cases, the BS may transmit a measurement configuration and/or a CSI report configuration directly to the one or more second wireless nodes. For example, the BS may transmit these configurations directly to the second wireless nodes when the second wireless nodes are within cell coverage of the BS. The operations 1300 may include the BS transmitting to one or more second wireless nodes a measurement configuration indicating which sidelink resource sets the one or more second wireless nodes are to monitor, and/or a CSI report configuration for the one or more second wireless nodes, wherein the CSI report configuration is associated with the one or more sidelink resource sets.

The BS may take various actions depending on the sidelink channel qualities reported in the feedback reports. The ordered sequence of the at least one parameter may be in various formats, for example, as described herein with respect to the operations 1100. The ordered sequence of parameters may enable the BS to configure transmit beams, receive beams, and/or sidelink resource sets that provide a suitable channel quality (e.g., a spectral efficiency, a throughput value, a spectral efficiency per energy unit, or a SINR associated with one or more transmit beams, one or more receive beams, or the sidelink resource sets) on sidelink air interfaces between wireless nodes. That is, the BS may determine one or more transmit beams, one or more receive beams, and/or one or more sidelink resource sets for the first wireless node and/or the second wireless nodes based on the feedback reports. The BS may transmit, to the first wireless node and/or the second wireless nodes, configurations indicating the one or more transmit beams, the one or more receive beams, and/or the one or more sidelink resource sets for sidelink communications determined based on the feedback reports.

Figure 14:
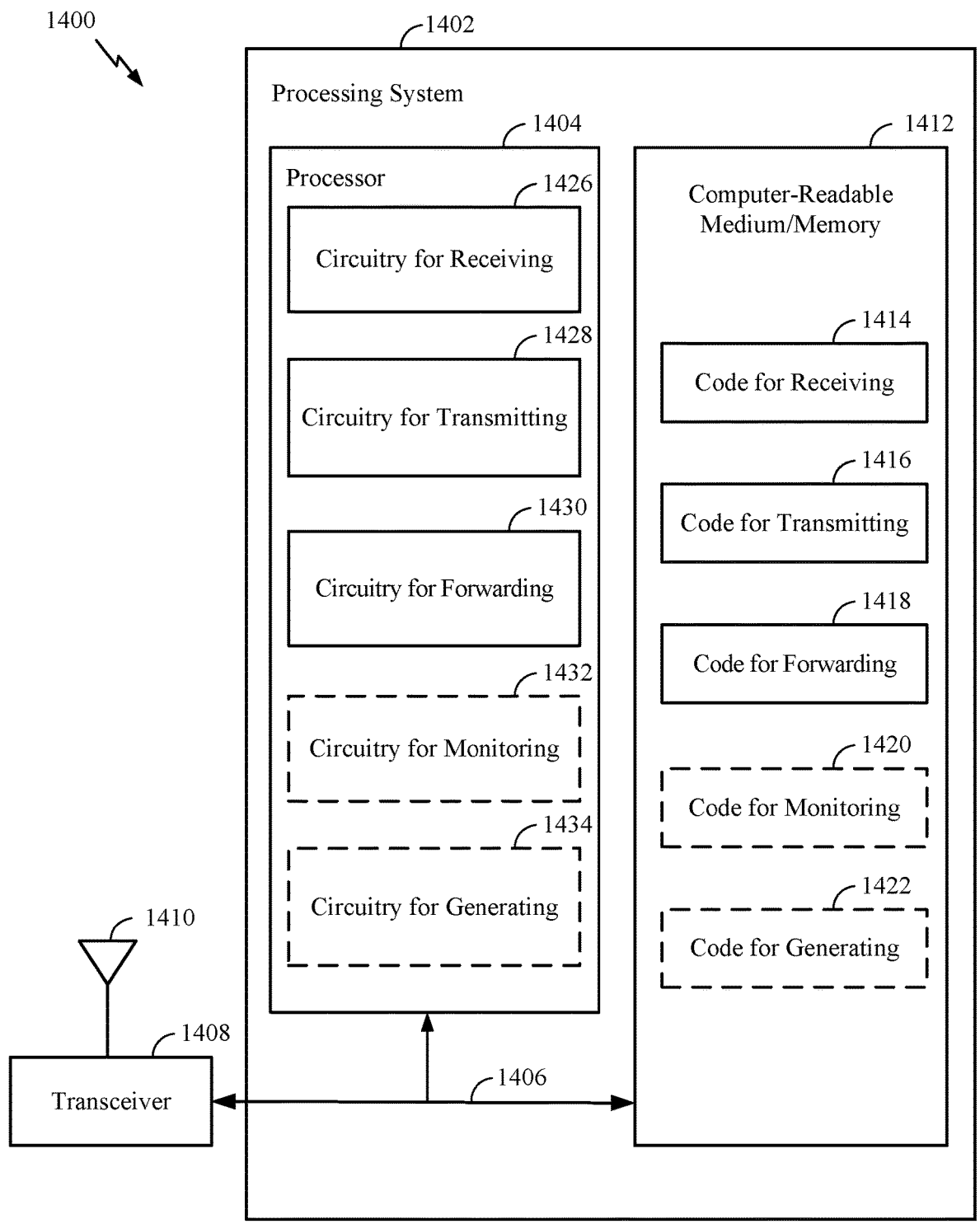
FIG. 14 illustrates a communications device (e.g., a wireless node) that may include various components configured to perform operations for the techniques disclosed herein in accordance with aspects of the present disclosure.

FIG. 14 illustrates a communications device 1400 (e.g., UE 120a and/or UE 120b) that may include various components (e.g., corresponding to means-plus-function components) configured to perform operations for the techniques disclosed herein, such as the operations illustrated in FIGS. 11 and/or 12. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIGS. 11 and/or 12, or other operations for performing the various techniques discussed herein related to sidelink CSI. In certain aspects, computer-readable medium/memory 1412 stores code for receiving 1414, code for transmitting 1416, code for forwarding 1418, cod for monitoring 1420, and/or code for generating 1422. In certain aspects, the processor 1404 has circuitry configured to implement the code stored in the computer-readable medium/memory 1412. The processor 1404 includes circuitry for receiving 1426, circuitry for transmitting 1428, circuitry for forwarding 1430, circuitry for monitoring 1432, and/or circuitry for generating 1434.

Figure 15:
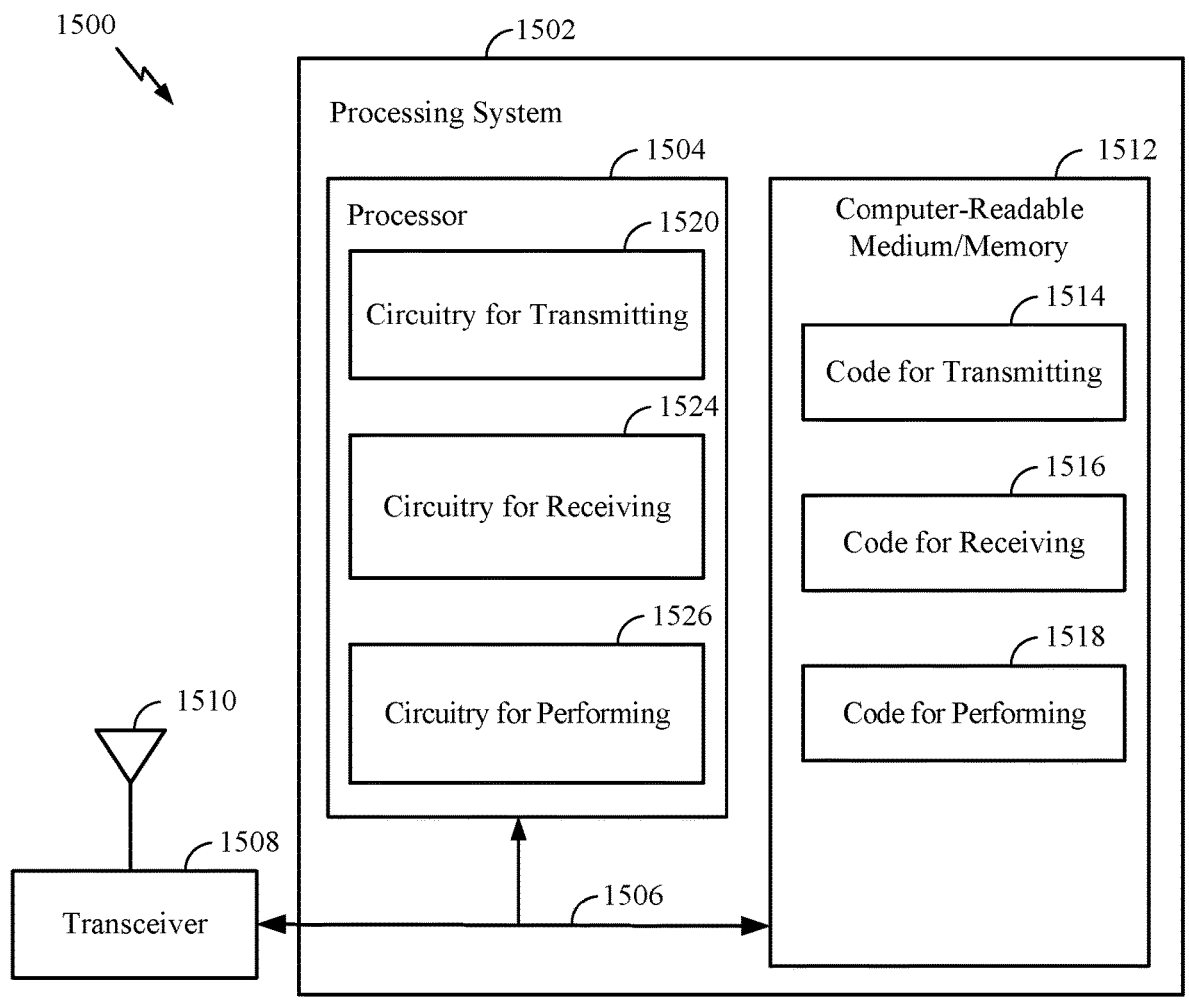
FIG. 15 illustrates a communications device (e.g., a base station) that may include various components configured to perform operations for the techniques disclosed herein in accordance with aspects of the present disclosure.

FIG. 15 illustrates a communications device 1500 (e.g., BS 110) that may include various components (e.g., corresponding to means-plus-function components) configured to perform operations for the techniques disclosed herein, such as the operations illustrated in FIG. 13. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 13, or other operations for performing the various techniques discussed herein related to sidelink CSI. In certain aspects, computer-readable medium/memory 1512 stores code for transmitting 1514, code for receiving 1516, and/or code for performing 1518. In certain aspects, the processor 1504 has circuitry configured to implement the code stored in the computer-readable medium/memory 1512. The processor 1504 includes circuitry for transmitting 1520, circuitry for receiving 1524, and/or circuitry for performing 1526.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies.

For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11, FIG. 12, and/or FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a first wireless node, comprising:
   transmitting, to one or more second wireless nodes, a channel state information (CSI) report configuration indicating to report feedback associated with one or more sidelink communication links, wherein the CSI report configuration is associated with one or more sidelink resource sets and a measurement configuration indicating that the one or more second wireless nodes are to monitor the one or more sidelink resource sets;
   transmitting, to the one or more second wireless nodes, one or more sidelink reference signals; and
   receiving one or more feedback reports from the one or more second wireless nodes, wherein each of the one or more feedback reports comprises an ordered sequence of at least one parameter associated with a sidelink channel quality of the one or more sidelink reference signals.

2. The method of claim 1, wherein each of the one or more sidelink resource sets comprises one or more sidelink resources, wherein each of the one or more sidelink resources comprises one or more symbols, and wherein each of the one or more sidelink resources corresponds to a different transmission configuration indication (TCI) state or a different quasi-colocation (QCL) relationship associated with spatial reception parameters.

3. The method of claim 1, wherein a sidelink reference signal of the one or more sidelink reference signals comprises at least one of a sounding reference signal or a CSI reference signal (CSI-RS).

4. The method of claim 1, further comprising:
transmitting, to the one or more second wireless nodes, sidelink communications based on the one or more feedback reports.

5. The method of claim 1, further comprising:
forwarding, to a network entity, the one or more feedback reports based on the CSI report configuration, wherein the CSI report configuration indicates one or more sidelink resources for receiving feedback from the one or more second wireless nodes.

6. The method of claim 1, wherein the ordered sequence of the at least one parameter includes a plurality of parameter values, each parameter value being associated with at least one of the one or more sidelink resource sets or one or more sidelink resources of one of the one or more sidelink resource sets.

7. The method of claim 1, wherein the ordered sequence of the at least one parameter is ordered based on at least one of the one or more sidelink resource sets or one or more sidelink resources of one of the one or more sidelink resource sets.

8. The method of claim 7, wherein the ordered sequence of the at least one parameter is ordered based on at least one of a spectral efficiency, a throughput value, a spectral efficiency per energy unit, a channel quality indicator (CQI), or a signal-to-noise-plus-interference ratio (SINR) associated with at least one of the one or more sidelink resource sets or the one or more sidelink resources of one of the one or more sidelink resource sets.

9. The method of claim 1, wherein the ordered sequence of the at least one parameter includes a plurality of tuples ordered based on the sidelink channel quality associated with at least one of the one or more sidelink resource sets or one or more sidelink resources of one of the one or more sidelink resource sets.

10. The method of claim 1, wherein the at least one parameter comprises at least one of a reference signal received power (RSRP), a received signal strength indicator (RSSI), a signal-to-noise-plus-interference ratio (SINR), a transmit precoder matrix indicator (TPMI), a rank indicator (RI), a CSI reference signal (CSI-RS) resource indicator (CRI), a sounding reference signal indicator (SRI), a channel quality indicator (CQI), or a sidelink resource set indicator.

11. The method of claim 1, wherein the one or more sidelink resource sets are within one or more sidelink bandwidth parts (BWPs).

12. The method of claim 11, further comprising:
receiving, from a network entity, a reference signal (RS) configuration indicating the one or more sidelink resource sets;
determining that the first wireless node is configured with a plurality of RS configurations comprising the RS configuration in a sidelink BWP and an another RS configuration in an uplink BWP;
determining a sidelink resource set for RS transmissions based on the plurality of RS configurations; and
transmitting a reference signal, to the network entity and the one or more second wireless nodes, via the sidelink resource set.

13. The method of claim 1, wherein the one or more sidelink resource sets are within an uplink bandwidth part.

14. The method of claim 13, further comprising:
receiving, from a network entity, the CSI report configuration associated with the one or more sidelink resource sets within the uplink bandwidth part.

15. The method of claim 1, wherein at least one of the one or more sidelink resource sets includes at least two sidelink resources in a same slot and non-consecutive to each other with respect to time domain resources, wherein each of the at least two sidelink resources includes one or more consecutive orthogonal frequency-division multiplexing (OFDM) symbols.

16. The method of claim 15, wherein the at least two sidelink resources are in a same bandwidth and correspond to a same uplink antenna port.

17. The method of claim 1, wherein receiving the one or more feedback reports comprises receiving the one or more feedback reports via at least one of a long format physical sidelink feedback channel (PSFCH), a physical sidelink control channel (PSCCH), or a physical sidelink shared channel (PSSCH).

18. A method of wireless communication by a second wireless node, comprising:
receiving, from a first wireless node, a measurement configuration indicating one or more sidelink resource sets to monitor and a channel state information (CSI) report configuration associated with the one or more sidelink resource sets;
monitoring sidelink transmissions, from the first wireless node, via the one more sidelink resource sets based at least in part on the measurement configuration;
generating, based on the CSI report configuration, a feedback report including an ordered sequence of at least one parameter associated with a sidelink channel quality of the sidelink transmissions; and
transmitting the feedback report to the first wireless node.

19. The method of claim 18, wherein each of the one or more sidelink resource sets comprises one or more sidelink resources, wherein each sidelink resource comprises one or more symbols, and wherein each sidelink resource corresponds to a different transmission configuration indication (TCI) state or a quasi-colocation (QCL) relationship associated with spatial reception parameters.

20. The method of claim 18, wherein the ordered sequence of the at least one parameter includes a plurality of parameter values, each parameter value being associated with at least one of the one or more sidelink resource sets or one or more sidelink resources of one of the one or more sidelink resource sets.

21. The method of claim 18, wherein the ordered sequence of the at least one parameter is ordered based on the sidelink channel quality associated with at least one of the one or more sidelink resource sets or one or more sidelink resources of one of the one or more sidelink resource sets.

22. The method of claim 21, wherein the ordered sequence of the at least one parameter is ordered based on at least one of a spectral efficiency, a throughput value, a spectral efficiency per energy unit, or a SINR associated with at least one of the one or more sidelink resource sets or the one or more sidelink resources of one of the one or more sidelink resource sets.

23. The method of claim 18, wherein the ordered sequence of the at least one parameter includes a plurality of tuples ordered based on the sidelink channel quality associated with at least one of the one or more sidelink resource sets or one or more sidelink resources of one of the one or more sidelink resource sets.

24. The method of claim 18, wherein the at least one parameter comprises at least one of a reference signal received power (RSRP), a received signal strength indicator (RSSI), a signal-to-noise-plus-interference ratio (SINR), a transmit precoder matrix indicator (TPMI), a rank indicator (RI), a CSI reference signal resource indicator (CRI), a sounding reference signal (SRI), a channel quality indicator (CQI), or a sidelink resource set indicator.

25. The method of claim 18, wherein the CSI report configuration indicates one or more sidelink resources for transmitting the feedback report to the first wireless node, and wherein the one or more sidelink resources are within one or more bandwidth parts (BWPs).

26. An apparatus for wireless communication, comprising:
a receiver configured to:
receive one or more feedback reports from one or more second wireless nodes, wherein each of the one or more feedback reports includes an ordered sequence of at least one parameter associated with a sidelink channel quality of one or more sidelink reference signals; and
a transmitter configured to:
transmit, to the one or more second wireless nodes, a channel state information (CSI) report configuration indicating to report feedback associated with one or more sidelink communication links, wherein the CSI report configuration is associated with one or more sidelink resource sets and a measurement configuration indicating that the one or more second wireless nodes are to monitor the one or more sidelink resource sets; and
transmit, to the one or more second wireless nodes, the one or more sidelink reference signals.

27. The apparatus of claim 26, wherein the ordered sequence of the at least one parameter is ordered based on at least one of the one or more sidelink resource sets or one or more sidelink resources of one of the one or more sidelink resource sets.

28. The apparatus of claim 26, wherein the ordered sequence of the at least one parameter is ordered based on at least one of a spectral efficiency, a throughput value, a spectral efficiency per energy unit, a channel quality indicator (CQI), or a signal-to-noise-plus-interference ratio (SINR) associated with at least one of the one or more sidelink resource sets or one or more sidelink resources of one of the one or more sidelink resource sets, and
wherein the at least one parameter comprises at least one of a reference signal received power (RSRP), a received signal strength indicator (RSSI), a signal-to-noise-plus-interference ratio (SINK), a transmit precoder matrix indicator (TPMI), a rank indicator (RI), a CSI reference signal resource indicator (CRI), a sounding reference signal indicator (SRI), a channel quality indicator (CQI), or a sidelink resource set indicator.

29. An apparatus for wireless communication, comprising:
a receiver configured to:
receive, from a first wireless node, a measurement configuration indicating one or more sidelink resource sets to monitor and a channel state information (CSI) report configuration associated with the one or more sidelink resource sets, and
monitor sidelink transmissions, from the first wireless node, via the one more sidelink resource sets based at least in part on the measurement configuration;
a processing system and a memory configured to generate, based on the CSI report configuration, a feedback report including an ordered sequence of at least one parameter associated with a sidelink channel quality of the sidelink transmissions; and
a transmitter configured to transmit the feedback report to the first wireless node.

30. The apparatus of claim 29, wherein the ordered sequence of the at least one parameter comprises a plurality of parameter values, each parameter value being associated with at least one of the one or more sidelink resource sets or one or more sidelink resources of one of the one or more sidelink resource sets.

\* \* \* \* \*